US 11,399,324 B2

United States Patent
da Silva et al.

(10) Patent No.: US 11,399,324 B2
(45) Date of Patent: Jul. 26, 2022

(54) ENHANCEMENTS TO CGI REPORTING IN MULTI-CONNECTIVITY

(71) Applicant: Telefonaktiebolaget LM Ericsson (publ), Stockholm (SE)

(72) Inventors: Icaro L. J. da Silva, Solna (SE); Oumer Teyeb, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 163 days.

(21) Appl. No.: 16/476,388

(22) PCT Filed: Jun. 10, 2019

(86) PCT No.: PCT/SE2019/050533
§ 371 (c)(1),
(2) Date: Jul. 8, 2019

(87) PCT Pub. No.: WO2020/032845
PCT Pub. Date: Feb. 13, 2020

(65) Prior Publication Data
US 2020/0359282 A1    Nov. 12, 2020

Related U.S. Application Data

(60) Provisional application No. 62/715,613, filed on Aug. 7, 2018.

(51) Int. Cl.
*H04W 4/00* (2018.01)
*H04W 36/00* (2009.01)
*H04W 92/20* (2009.01)

(52) U.S. Cl.
CPC .  *H04W 36/00835* (2018.08); *H04W 36/0058* (2018.08); *H04W 36/0069* (2018.08); *H04W 92/20* (2013.01)

(58) Field of Classification Search
CPC ......... H04W 36/0058; H04W 36/0061; H04W 36/0069; H04W 36/0083; H04W 36/00835
See application file for complete search history.

(56) References Cited

U.S. PATENT DOCUMENTS 6,643,512 B1 * 11/2003 Ramaswamy ........ H04W 36/04
455/435.1
8,891,394 B2 * 11/2014 Jung ................. H04W 36/0058
370/252

(Continued)

FOREIGN PATENT DOCUMENTS

WO    2016096558 A1    6/2016

OTHER PUBLICATIONS

"3GPP TS 36.300 V15.2.0"; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Jun. 2018, pp. 1-75.

(Continued)

*Primary Examiner* — Matthew W Genack
(74) *Attorney, Agent, or Firm* — Sage Patent Group

(57) ABSTRACT

Embodiments include methods for a master node in a radio access network (RAN) to establish neighbor relations with a further RAN node, the master node operating in multi-connectivity towards a user equipment (UE) together with a secondary node in the RAN. Embodiments include determining that a first cell identifier associated with a cell is not included in a neighbor relations table maintained by the master node. Embodiments include sending, to the UE, a request to report a second cell identifier associated with the cell. The request includes the first cell identifier and is sent without determining whether the cell is a serving or neighbor cell for the UE. Embodiments include determining (Continued)

whether to establish a neighbor relation with a node associated with the first cell identifier, based on a report from the UE in response to the request. Embodiments also include complementary methods performed by a UE.

18 Claims, 15 Drawing Sheets

(56) References Cited

U.S. PATENT DOCUMENTS

| | | | |
|---|---|---|---|
| 10,485,054 B2* | 11/2019 | Tenny | H04B 7/086 |
| 2008/0101301 A1* | 5/2008 | Thomas | H04W 36/04 |
| | | | 370/335 |
| 2009/0316654 A1* | 12/2009 | Prakash | H04W 36/0088 |
| | | | 370/331 |
| 2013/0337778 A1 | 12/2013 | Ye et al. | |
| 2017/0347391 A1 | 11/2017 | Tenny et al. | |
| 2020/0359302 A1* | 11/2020 | Chen | H04W 48/12 |

OTHER PUBLICATIONS

"3GPP TS 36.331 V15.2.2"; 3rd Generation Partnership Project; Technical Specification Group Radio Access Network; Evolved Universal Terrestrial Radio Access (E-UTRA); Radio Resource Control (RRC); Protocol specification (Release 15), Jun. 2018, pp. 1-791.

"3GPP TS 38.331 V15.2.1"; 3rd Generation Partnership Project; Technical Specification Group Radio Access Network; NR; Radio Resource Control (RRC) protocol specification (Release 15), Jun. 2018, pp. 1-81.

"3GPP TR 38.804 V14.0.0"; 3rd Generation Partnership Project; Technical Specification Group Radio Access Network; Study on New Radio Access Technology; Radio Interface Protocol Aspects (Release 14), Mar. 2017, pp. 1-57.

"ANR for NSA NR", 3GPP TSG-RAN WG2 #98-AdHoc; R2-1707283; Qingdao, China; Jun. 27-29, 2017; pp. 1-5.

"Cell global identity and ANR functionality", 3GPP TSG-RAN WG2 NR Adhoc #2; R2-1706455; Qingdao, China; Jun. 27-29, 2017; pp. 1-7.

Sanneck, et al., "Self-Configuration ('Plug-and-Play')", chapter in LTE Self-Organising Networks (SON): Network Management Automation for Operational Efficiency (First Ed.), John Wiley & Sons, Ltd., Chichester, UK; Jan. 30, 2012; pp. 81-133.

First Examination Report Action dated Dec. 23, 2021 for Indian Patent Application No. 202047055046, 8 pages.

* cited by examiner 5.5.4.1 General
If security has been activated successfully, the UE shall:
  1> for each measId included in the measIdList within VarMeasConfig:
  ...
  2> else if the reportType or the corresponding reportConfig is set to reportCGI:
    3> consider any ~~neighbouring~~ cell detected on the associated measurement object which has a physical cell identity matching the value of the cellForWhichToReportCGI to be applicable;

FIG. 7

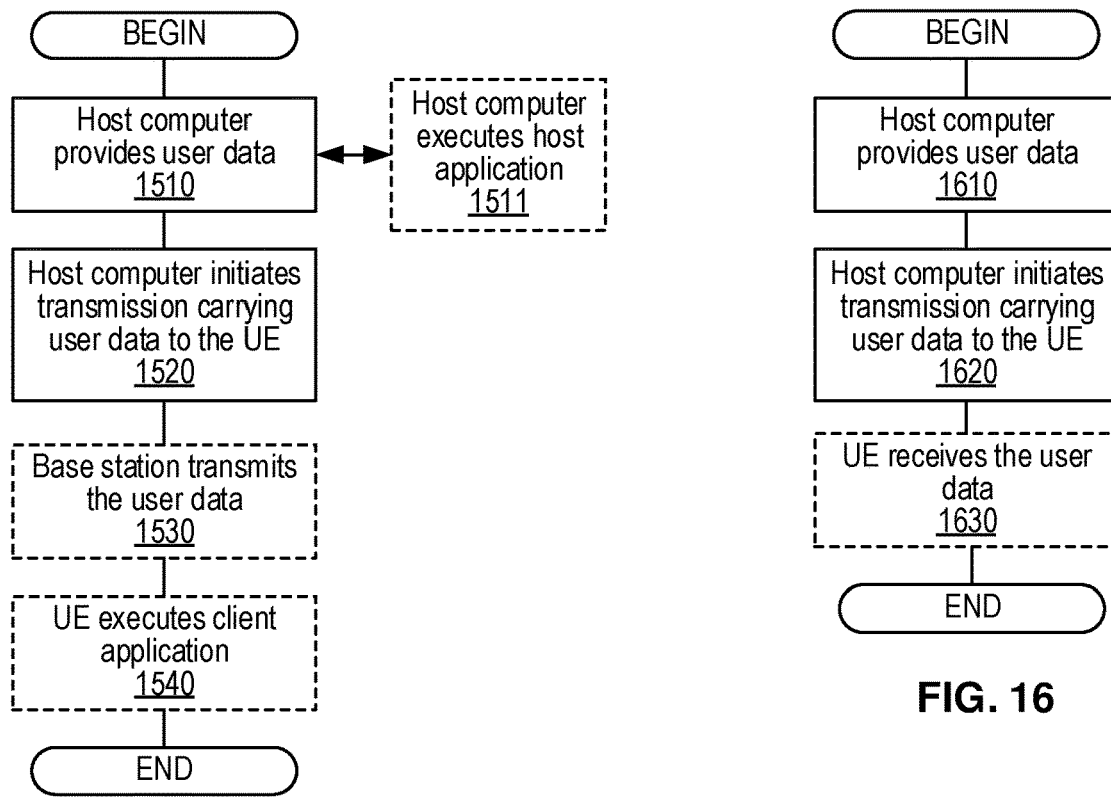
FIG. 15
FIG. 16
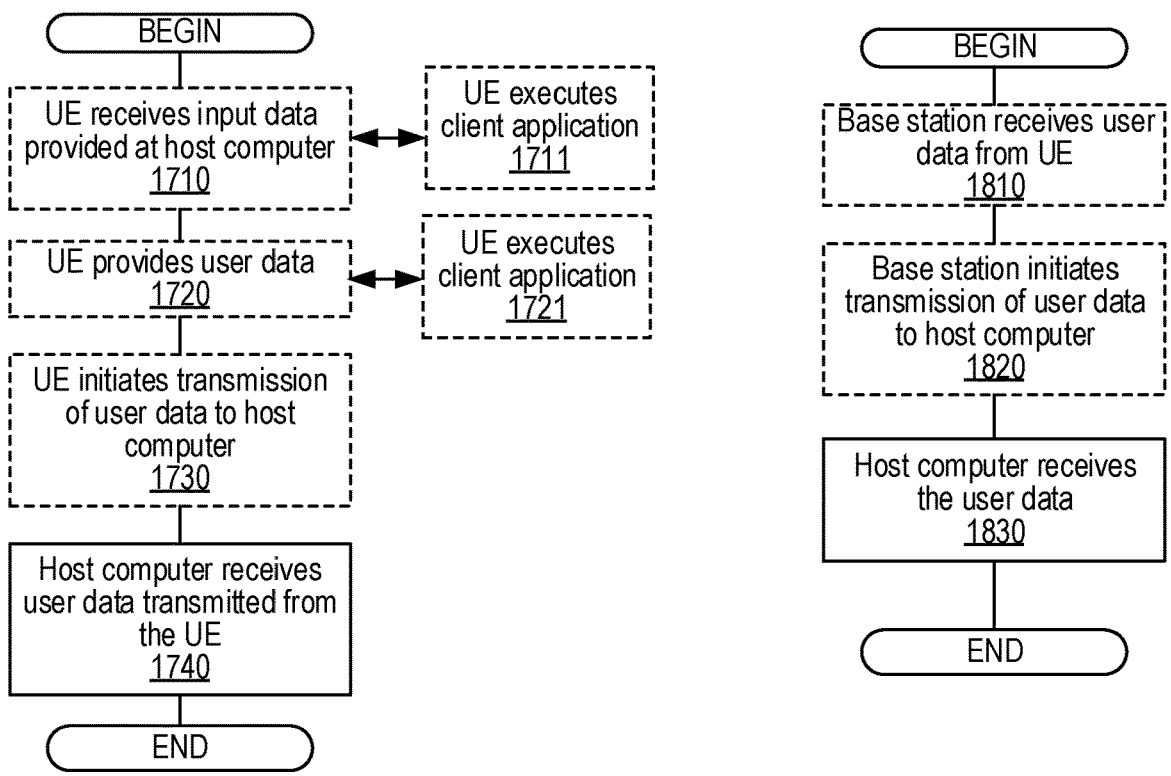
FIG. 17
FIG. 18

ENHANCEMENTS TO CGI REPORTING IN MULTI-CONNECTIVITY

TECHNICAL FIELD

The present application relates generally to the field of wireless communication systems, and more specifically to techniques that facilitate simultaneous connectivity of a wireless device or user equipment (UE) to multiple nodes in a radio access network (RAN).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

In LTE, the Radio Resource Control (RRC) protocol is used to configure, setup, and maintain the radio connection between the user equipment (UE) and the base station, known as the evolved Node B (eNB). When the UE receives an RRC message from the eNB, it will apply the configuration (also referred to herein as "compile the configuration"), and if this succeeds the UE generates an RRC complete message that indicates the transaction ID of the message that triggered this response.

Since LTE Release 8, three Signaling Radio Bearers (SRBs), namely SRB0, SRB1 and SRB2 have been available for the transport of RRC and Non Access Stratum (NAS) messages between the UE and eNB. A new SRB, known as SRB1bis, was also introduced in rel-13 for supporting DoNAS (Data Over NAS) in NB-IoT.

SRB0 carries RRC messages using the CCCH logical channel, and it is used for handling RRC connection setup, resume, and re-establishment. Once the UE is connected to the eNB (i.e., RRC connection setup or RRC connection reestablishment/resume has succeeded), SRB1 is used for handling further RRC messages (which may include a piggybacked NAS message) and NAS messages, prior to the establishment of SRB2, all using DCCH logical channel. SRB2 is used for RRC messages such as logged measurement information, as well as for NAS messages, all using DCCH. SRB2 has a lower priority than SRB1, because logged measurement information and NAS messages can be lengthy and could cause the blocking of more urgent and smaller SRB1 messages. SRB2 is always configured by E-UTRAN after security activation.

A dual connectivity framework was initially defined in LTE Release 12. Dual connectivity (or DC) refers to a mode of operation in which a UE, in RRC_CONNECTED state, consumes radio resources provided by at least two different network points connected to one another with a non-ideal backhaul. In the LTE standards, these two network points may be referred to as a "Master eNB" (MeNB) and a "Secondary eNB" (SeNB). More generally, they can be referred to as a master node (MN) and a secondary node (SN). DC can be viewed as a special case of carrier aggregation (CA), where the aggregated carriers, or cells, are provided by network nodes that are physically separated from one another and that are not connected to one another through a fast, quality, connection.

More specifically, in DC, the UE is configured with a Master Cell Group (MCG) and a Secondary Cell Group (SCG). A Cell Group (CG) is a group of serving cells associated with either the MeNB or the SeNB(s). MCG and SCG are defined as follows:

The Master Cell Group (MCG) is a group of serving cells associated with the MeNB, including a primary cell (PCell) and optionally one or more secondary cells (SCells).

A Secondary Cell Group (SCG) is a group of serving cells associated with the SeNB including a Primary Scell (pSCell) and optionally one or more SCells.

Put another way, a UE in DC maintains simultaneous connections to anchor and booster nodes, where the anchor node is also referred to as the MeNB and the booster nodes are also referred to as SeNBs. As its name implies, the MeNB terminates the control plane connection towards the UE and, as such, is the controlling node of the UE, including handovers to and from SeNBs. For example, the MeNB is the eNB that terminates at least the S1-MME connection, i.e., the connection between the eNB and the Mobility Management Entity (MME) for the UE. An SeNB is an eNB that is providing additional radio resources (e.g., bearers) for the UE but that is not the MeNB. Types of radio resource bearers include MCG bearers, SCG bearers, and split bearers.

RRC connection with the UE is handled only by the MeNB and, accordingly, SRBs (Signaling Radio Bearers) are always configured as MCG bearer type and therefore only use the radio resources of the MeNB. However, the MeNB can also configure the UE based on input from the SeNB and hence the SeNB can also indirectly control the UE. In LTE-DC configuration, the MeNB is connected to the SeNBs via the X2 interface.

According to LTE principles, UEs provide measurement reports—whether due to event trigger or a periodic trigger—comprising measurements of serving cell(s). For UE in LTE-DC, serving cell means both cells in MCG and cell in SCG. For mobility measurement, an MeNB configures a UE according to various criteria including, e.g., frequency to measure, how to report, etc. Correspondingly, the UE sends measurement results to the MeNB once the measurement criteria are met. When the UE sends a measurement report to the network, whether event-triggered or periodic-triggered, the UE should always include measurement results of its serving cell(s). For a UE in LTE-DC, "serving cells" includes cells in MCG (provided by MeNB) and cell(s) in SCG (provided by SeNB).

FIG. 1A illustrates various exemplary LTE DC scenarios involving UEs 110 and base stations (eNBs) 120. As shown, only one SeNB (at most) is connected to any of the illustrated UEs. However, more than one SeNB can serve a UE in general. Although FIG. 1A shows only one cell from each MeNB and SeNB serving the UE, the UE can have more than one serving cell from each, as discussed above. FIG. 1A also illustrates that dual connectivity is a UE-specific feature and that a given network node (or a serving cell) can support a dual-connected UE and a legacy UE at the same time. In other words, MeNB and SeNB are roles played, or functions provided, by eNBs 120 for a given UE. Thus, while the eNBs 120 in FIG. 1A are labeled "MeNB" and "SeNB," this indicates only that they are playing this role for at least one UE 110. Indeed, a given eNB 120 may be an MeNB for one UE 110 while being an SeNB for another UE.

The master/anchor and secondary/booster roles are defined from a UE's point of view, which means that a node (or cell) that acts as an anchor to one UE may act as booster to another UE. Likewise, although a given UE in a DC scenario reads system information from the anchor node (or cell), a node (or cell) acting as a booster to one UE may or may not distribute system information to another UE. Furthermore, in LTE, only inter-frequency DC is supported (i.e., the MCG and SCG must use different carrier frequencies).

In summary, DC allows an LTE-capable UE to be connected to two nodes—MeNB and SeNB—to receive data from both nodes and thereby increase its data rate. The MeNB (or MN) provides system information, terminates the control plane, and can terminate the user plane. An SeNB (or SN), on the other hand, terminates only the user plane. The aggregated user plane (UP) protocol stack for LTE DC is illustrated in FIG. 1B and includes MCG bearers (terminated by MeNB), SCG bearers (terminated by SeNB), and split bearers (terminated by MeNB and SeNB). This UP aggregation achieves benefits such as increasing the per user throughput for users that have good channel conditions and the capability of receiving and transmitting at higher data rates than can be supported by a single node, even without a low-latency backhaul/network connection between the MeNB and SeNB.

In 3GPP, a study item on a new radio interface for 5G has recently been completed and 3GPP is proceeding to standardize a new radio interface, often abbreviated by NR (New Radio). At a minimum, NR can be deployed independently without any interworking with LTE, which can be referred to as NR stand-alone (SA) operation. In this mode, a NR gNB can be connected to 5G core network (5GC) and an LTE eNB can be connected to an EPC with no interconnection between them.

In addition, 3GPP TR 38.804 describes various exemplary DC scenarios or configurations where the MN and SN are applying either NR, LTE or both. The following terminology is used to describe these exemplary DC scenarios or configurations:

DC: LTE DC (i.e., both MN and SN employ LTE, as discussed above);

EN-DC: LTE-NR dual connectivity where an LTE eNB is the MN and an NR en-gNB is the SN. The SN relies on the MN (e.g., via the X2 interface) for a control plane (CP) connection to the LTE evolved packet core (EPC) network. This is also referred to as Non-standalone NR (NSA) NR. In this case, the functionality of an NR SN cell is limited and would be used for connected mode UEs as a booster and/or diversity leg, but a UE cannot camp on or be handed over to these NR cells.

NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.

NE-DC: LTE-NR dual connectivity where a UE is connected to one gNB that acts as a MN and one ng-eNB that acts as a SN. The gNB is connected to 5GC and the ng-eNB is connected to the gNB via the Xn interface.

NR-DC (or NR-NR DC): both MN and SN employ NR.

MR-DC (multi-RAT DC): a generalization of the Intra-E-UTRA Dual Connectivity (DC) described in TS 36.300, where a multiple Rx/Tx UE may be configured to utilize resources provided by two different nodes connected via non-ideal backhaul, one providing E-UTRA access and the other one providing NR access. One node acts as the MN and the other as the SN. The MN and SN are connected via a network interface and at least the MN is connected to the core network. EN-DC and NE-DC are two different example cases of MR-DC.

Since deployment and/or migration for these options may differ for different operators, it could be possible to have deployments with multiple options in parallel in the same network. In combination with LTE/NR DC solutions, it is also possible to support CA (Carrier Aggregation) in each cell group (i.e., MCG and SCG) and DC between nodes on same RAT (e.g., NR-NR DC). For the NR cells, a consequence of these different deployments is the co-existence of NR cells supporting SA only, NSA only, or both SA and NSA.

FIG. 2 is a block diagram showing a high-level comparison of the EN-DC, NE-DC, and NGEN-DC options briefly mentioned above. In EN-DC (A), the NR en-gNB (SN) is operating in NSA mode and has no direct control-plane (CP) interface with the EPC. In NE-DC (B), the gNB MN has a direct interface with the 5GC while LTE SN's CP connection is via the MN (e.g., over the Xn interface). The NGEN-DC (C) scenario is similar to EN-DC (A), except that the ng-eNB CP connection is to 5GC via NG-C interface instead of to EPC via S1-C interface. Although not shown in FIG. 2, the NR-NR DC control plane is still undergoing standardization. As such, it is possible that it could resemble LTE DC (i.e., UE has only one RRC terminated at the MN) or EN-DC (i.e., UE has two RRC terminations, one at the MN and another at the SN).

Since LTE Rel-8, Automatic Neighbor Relations (ANR) has been standardized to enable an eNB to automatically establish a relationship with another eNB by facilitating an automatic setup of an X2 interface between the two eNBs. This can be done by the serving eNB configuring a UE with a physical cell identity (PCI) and a frequency to receive and/or measure (e.g., a measurement object), so that the UE reads the system information of the configured neighbour cell broadcast in System Information Block 1 (SIB1) and reports relevant received information such as cell global identifier (CGI), tracking area code (TAC), public land mobile network (PLMN) identifier, etc. to the serving eNB in a measurement report. The CGI is a globally unique identifier for a base station (e.g., eNB or gNB), and includes four parts: Mobile Country Code (MCC), Mobile Network Code (MNC), Location Area Code (LAC), and Cell Identification (CI). For eNBs, the CGI is referred to as "eCGI" and also includes an eNB-ID. As used herein, however, the term "CGI" encompasses globally unique identifiers for any type of base station, including eNBs and gNBs.

After receiving this report, the serving eNB can find the potential neighbour eNB and establish a neighbour relation (e.g., trigger the setup of an X2 connection). The neighbour information exchange, which occurs during the X2 Setup procedure or in the eNB Configuration Update procedure, may be used for ANR purpose.

FIG. 3 illustrates the configuration of the ANR function between an eNB and an Operations and Maintenance (O&M) function in the LTE network. In this arrangement, the ANR function resides in the eNB and manages the conceptual Neighbour Relation Table (NRT). Located within ANR, the Neighbour Detection Function finds new neighbors and adds them to the NRT. In general, this is done by issuing measurement requests to, and receiving measurement reports, from the RRC function in the eNB. ANR also contains the Neighbour Removal Function which removes outdated neighbor relations from the NRT. This can be based on internal information, e.g., concerning past usage (or non-usage) of specific neighbor relations. The Neighbour Detection Function and the Neighbour Removal Function are implementation-specific but, as shown in FIG. 3, operate on the NRT via the NRT Management Function.

The NRT Management Function also allows O&M to manage the NRT. For example, O&M can add/delete neighbor cell relations and modify the attributes of the NRT via the NRT Management Function. The O&M system is informed about changes in the NRT made by the eNB through reports from the NRT Management Function.

In the context of ANR, a neighbour cell relation (NCR) can be explained as follows. An existing NCR from a source cell to a target cell means that eNB controlling the source cell: a) knows the ECGI/CGI and PCI of the target cell; b) has an entry in the NRT for the source cell identifying the target cell; and c) has the attributes in this NRT entry defined, either by O&M or set to default values. The source-cell eNB keeps a NRT for each source cell that the eNB provides. For each NCR, the NRT contains the Target Cell Identifier (TCI), which identifies the target cell. For E-UTRAN, TCI corresponds to the E-UTRAN CGI (ECGI) and the PCI of the target cell.

As shown in FIG. 3, each NCR has three attributes: NoRemove (or "NoRmv" for short), NoHO, and NoX2. If NoRemove is checked (e.g., indicated as positive in the NRT), the eNB shall not remove the particular NCR from the NRT. If NoHO is checked, the NCR shall not be used by the eNB for handover reasons. If NoX2 is checked, the Neighbour Relation shall not use an X2 interface in order to initiate procedures towards the eNB parenting the target cell. For the purposes of clarity, NCRs are cell-to-cell relations, while an X2 link is set up between two eNBs that provide the respective cells. Furthermore, NCRs are unidirectional, while an X2 link is bidirectional.

In the context of EN-DC, an existing NCR from a source E-UTRA cell to a target NR cell means that the eNB controlling the source cell knows the NCGI (NR CGI) and PCI of the target cell. An X2 link may be set up between eNB and en-gNB. The NoRemove, NoHO, and NoX2 attributes apply when the en-gNB provides the target cell. In addition, each NCR has the NoEN-DC attribute, which, if checked, means that the particular NCR shall not be used by the eNB for EN-DC.

Each E-UTRA cell contains an Inter Frequency Search list that indicates all frequencies that shall be searched. The PCI is defined by the carrier frequency (measurement object associated to the SSB associated to that cell) and NR-PCI.

The eNB can use the PCI reported by the UE to look up NCGI, TAC, and supported PLMN-ID(s) in O&M provisioned information or in information received on the X2 interface.

In the context of NR, is has been agreed that ANR and CGI reporting should be performed according to the following main principles: 1) UE connected to an LTE eNB is configured to report the CGI of an LTE cell or NR cell; and 2) UE connected to an NR gNB is configured to report the CGI of an LTE cell or NR cell.

Although the current ANR functionality (e.g., CGI reporting procedure) in LTE and NR enables a serving network node to configure the UE to report the CGI of a cell associated with a neighbour node, it does have several drawbacks, shortcomings, and/or limitations when applied to the new multi-connectivity architectures being standardized for 5G, such as EN-DC.

SUMMARY

Exemplary embodiments disclosed herein address these and other problems, issues, and/or drawbacks of existing solutions by providing a flexible and efficient approach for enabling a user equipment (UE) operating in multi-connectivity (e.g., single-RAT or multi-RAT) and having multiple serving cells to reporting of the CGI of a serving cell upon request of a network node. In the same manner, exemplary embodiments also enable the network node to request such information and utilize it for timely, correct, and efficient performance of Automatic Neighbor Relations (ANR) with neighboring network nodes. Furthermore, such timely, correct, and efficient ANR can facilitate improved mobility of a UE between various cells in the RAN, even in the case where the UE is utilizing multi-RAT multi-connectivity.

Exemplary embodiments include various methods and/or procedures for a node, in a radio access network (RAN), to establish a neighbor relation with a further node in the RAN. The exemplary methods and/or procedure can be performed by a master node (MN, e.g., eNB, gNB, or component thereof) operating in multi-connectivity towards a user equipment (UE) together with a secondary node (SN) in the RAN.

In some embodiments, the exemplary methods and/or procedures can include receiving, from the UE, a measurement report comprising a first cell identifier associated with a cell. In some embodiments, the first cell identifier can be a physical cell identifier (PCI). Furthermore, the first cell identifier can be associated with a cell provided by the secondary node or by a further node in the RAN (e.g., a node not operating in multi-connectivity with the master node towards the UE).

The exemplary methods and/or procedures can also include determining that the first cell identifier is not included in a neighbor relations table (NRT) maintained by the master node, and sending, to the UE, a request to report a second cell identifier associated with the cell. The request can include the first cell identifier, and can be sent without determining whether the cell is a serving cell for the UE or a neighbor cell for the UE. In some embodiments, the second cell identifier can be a cell global identifier (CGI).

In some embodiments, the exemplary methods and/or procedures can also include receiving, from the UE in response to the request, a report that includes the second cell identifier (e.g., CGI). In some embodiments, the report can also include an indication of whether the second cell identifier is associated with a serving cell for the UE or a neighbor cell for the UE. In some embodiments, the report can also include an indication of whether a serving cell is a primary secondary cell (PSCell) or a secondary cell (SCell). In some embodiments, the report can also include one or more further cell identifiers associated with respective further serving cells of the UE.

The exemplary methods and/or procedures can also include determining whether to establish neighbor relations with a node associated with the first cell identifier, based on the report from the UE in response to the request. This can be based on the content of the report (e.g., the CGI) and/or whether the report was received within a predetermined duration after the request was sent.

Other exemplary embodiments include methods and/or procedures performed by a user equipment (UE, e.g., wireless device, IoT device, etc. or component thereof) in multi-connectivity with a master node and a secondary node in a radio access network (RAN). These exemplary methods and/or procedures can include sending, to the master node, a measurement report comprising a first cell identifier associated with a cell. In some embodiments, the first cell identifier can be a physical cell identifier (PCI). Furthermore, the first cell identifier can be associated with a cell provided by the secondary node or by a further node in the RAN (e.g., a node not operating in DC with a master node towards the UE).

The exemplary methods and/or procedures can also include receiving, from the master node, a request to report a second cell identifier associated with the cell. In some embodiments, the second cell identifier can be a cell global identifier (CGI). The request can include a first cell identifier associated with the cell, e.g., the first cell identifier previously sent by the UE.

The exemplary methods and/or procedures can also include determining whether the cell is a serving cell for the UE or a neighbor cell for the UE. For example, the UE's serving cells (e.g., PSCells and SCells) can be provided by the secondary node, and neighbor cells can be provided by further nodes in the RAN (e.g., nodes not operating in multi-connectivity with a master node towards the UE).

In some embodiments, the exemplary methods and/or procedures can also include conditionally acquiring the second cell identifier via system information broadcast by the cell, based on the determination of whether the cell is a serving cell or a neighbor cell. The exemplary methods and/or procedures can also include sending, to the master node, a report including the second cell identifier. The report can be sent in response to the request regardless of whether the cell is a serving cell for the UE or a neighbor cell for the UE. In some embodiments, the report can also include an indication of whether the cell is a serving cell for the UE or a neighbor cell for the UE. In some embodiments, the report can also include an indication of whether a serving cell is a primary secondary cell (PSCell) or a secondary cell (SCell). In some embodiments, the report can also include one or more further cell identifiers associated with respective further serving cells of the UE.

Other exemplary embodiments include network nodes (e.g., base stations, eNBs, gNBs, etc. or components thereof) or user equipment (UEs, e.g., wireless devices, Internet-of-Things (IoT) devices, etc. or components thereof) configured to perform operations corresponding to any of the exemplary methods and/or procedures described herein.

Other exemplary embodiments include non-transitory, computer-readable media storing program instructions that, when executed by at least one processor, configure such network devices or UEs to perform operations corresponding to any of the exemplary methods and/or procedures described herein.

These and other objects, features and advantages of the embodiments of the present disclosure will become apparent upon reading the following Detailed Description in view of the Drawings briefly described below.

BRIEF DESCRIPTION OF THE DRAWINGS

FIG. 7 shows an exemplary amendment to 3GPP TS 38.331 (NR RRC Specification) to specify UE functionality in accordance with certain exemplary embodiments of the present disclosure.

FIGS. 15-18 are flow diagrams illustrating various exemplary methods and/or procedures implemented in a communication system, according to various exemplary embodiments of the present disclosure.

DETAILED DESCRIPTION

Figure 1A:
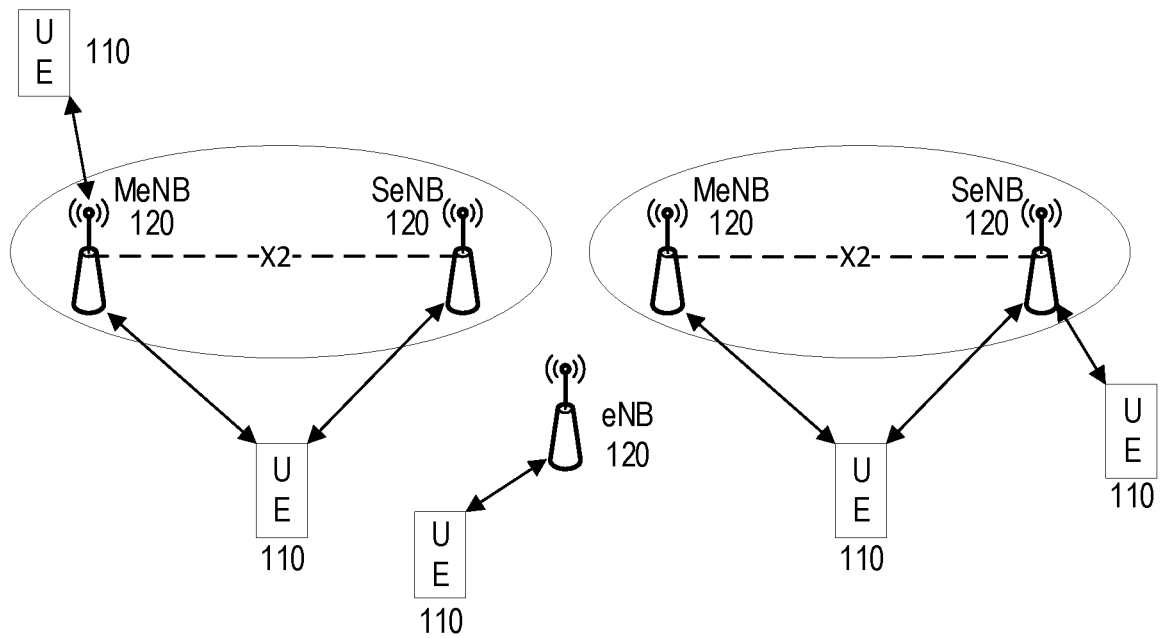
FIG. 1A is a high-level network diagram illustrating various exemplary Long-Term Evolution (LTE) dual connectivity (DC) scenarios involving user equipment (UEs) and evolved NodeBs (eNBs).
Figure 1B:
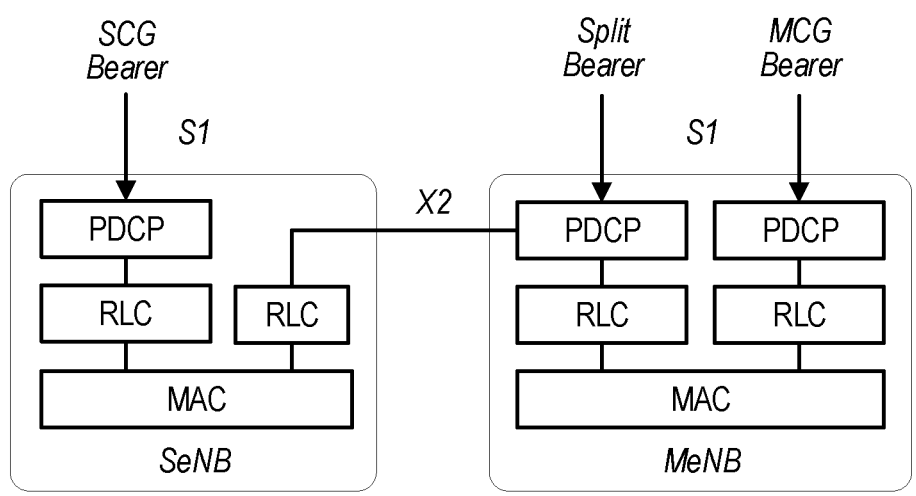
FIG. 1B illustrates an exemplary user plane (UP) protocol stack for LTE DC.
Figure 2:
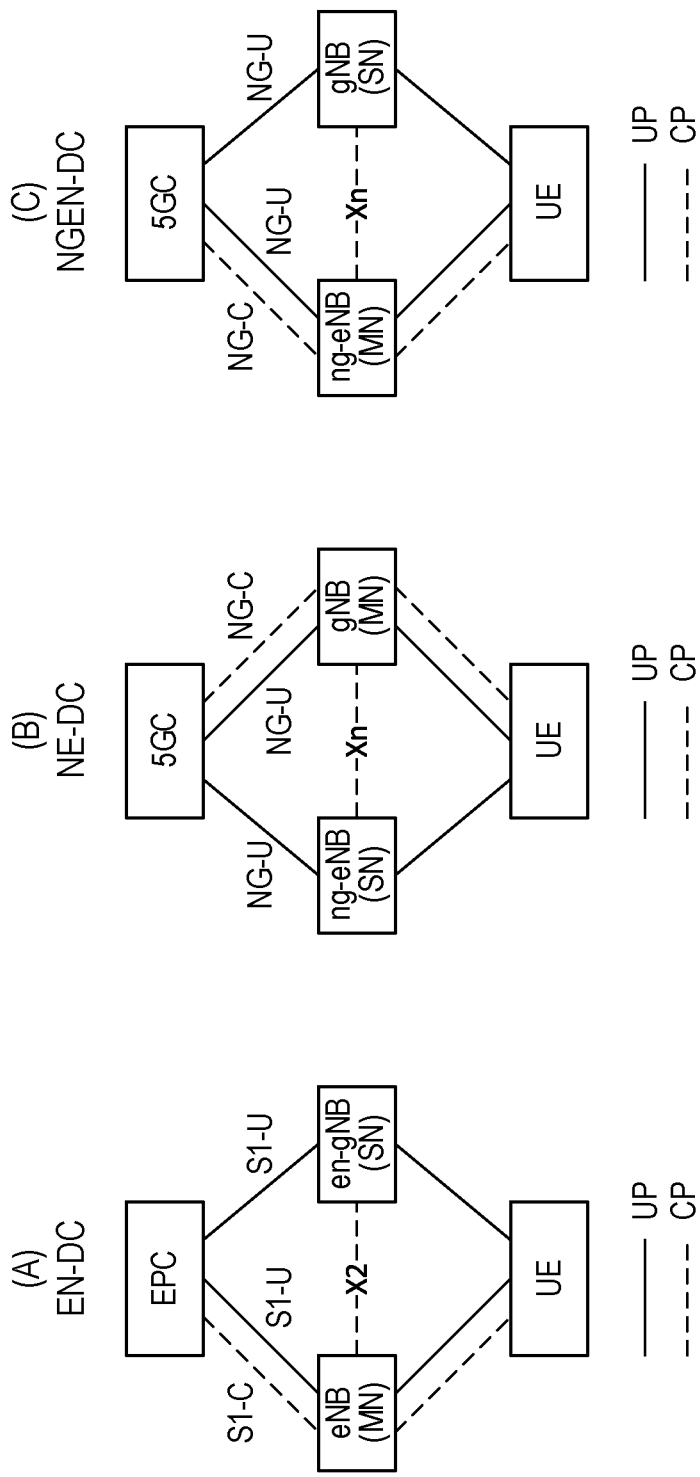
FIG. 2 is a block diagram showing a high-level comparison of the EN-DC, NE-DC, and NGEN-DC options.
Figure 3:
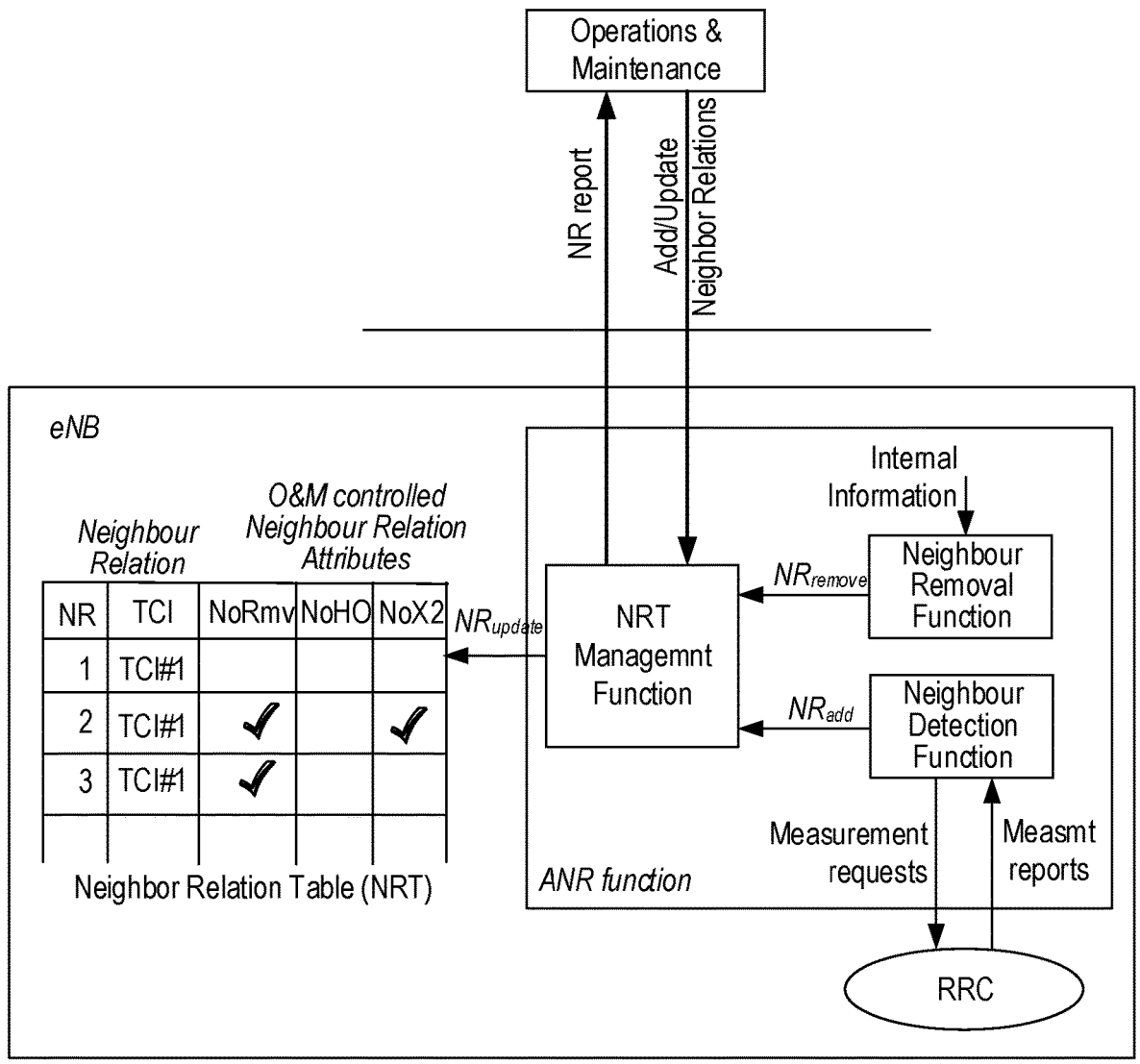
FIG. 3 illustrates an exemplary configuration and/or distribution of the Automatic Neighbor Relations (ANR) function in an LTE network between an eNB and an Operations and Maintenance (O&M) function.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein. Rather, these embodiments are provided as illustrative examples of the scope of the subject matter in a manner that will be understood by those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As mentioned above, the current ANR functionality (e.g., CGI reporting procedure) in LTE and NR enables a serving network node to configure the UE to report the CGI of a cell associated with a neighbour node, it does have several drawbacks, shortcomings, and/or limitations when applied to the new multi-connectivity architectures being standardized for 5G, such as EN-DC. These are discussed in more detail below.

As also mentioned above, in the context of NR, is has been agreed that ANR and CGI reporting should be performed according to the following main principles: 1) UE connected to an LTE eNB is configured to report the CGI of an LTE cell or NR cell; and 2) UE connected to an NR gNB is configured to report the CGI of an LTE cell or NR cell. Furthermore, agreements have been reached within 3GPP TSG RAN2 on the following additional details:

1: For ANR, including Intra and Inter RAT cases, the following ANR configuration are supported:
Inter-RAT ANR towards NR configured by eNB
Intra-RAT ANR towards NR configured by gNB
Inter-RAT ANR towards LTE configured by gNB 2: In case of EN-DC UE, ANR function towards NR cell can be configured by SN.
  i. UE can only be configured with a single reportCGI configuration, from either MN or SN.
  ii. Configuration of ANR towards NR cell requires coordination between MN and SN 3: For ANR reporting, the CGI content includes:
  a: PLMN list, TAC, frequency band list and CGI as baseline
  b: RANAC is also reported, if included in SIB1

4: In the case SIB1/RMSI is not broadcast, UE should report a notification to network. UE report includes:
  a: "no SIB1 provided" indication
  FFS whether UE should report where CD-SSB of measured SSB can be found 5: In the case SIB1/RMSI is not broadcast, UE should report UE should report "no SIB1 provided indication" without waiting for T321 timer expiry and stop timer 6: In case of EN-DC, if reportCGI for NR cell is configured by eNB, then UE behavior follows inter-RAT ANR T321 value; if reportCGI for NR cell is configured by gNB, then UE behavior follows intra-RAT ANR T321 value. RAN2 sends an Ls to RAN4 to confirm RAN2 understanding 7: RAN2 to send an Ls to RAN4 on guidance for T321 values in the following ANR measurement cases:
UE served by LTE cell towards NR cell
UE served by NR cell towards NR cell
UE served by NR cell towards LTE cell 8: For UE capability for ANR towards NR cell:
  a: DRX based reading of ANR towards NR cell related measurement should be supported 9: RAN2 to send an Ls to RAN4 to ask whether it is feasible to use autonomous gap 10: For ANR CGI reporting, only one NR neighbor cell configuration is supported at any given time.

11: a. Introduce a UE capability bit in NR for Intra-RAT ANR (including inter and Intra frequency)
  b. Introduce a UE capability bit in NR for Inter-RAT ANR towards LTE cell.

c. Introduce a UE capability bit in LTE for Inter-RAT ANR towards NR cell. FFS Whether 2 separate capability bits are needed for LTE with and without EN-DC configured.

12: For ANR support, RAN2 sees no need to differentiate between FR1 and FR2. RAN2 to send an Ls to RAN4 to ask for opinion. FFS where cellsForWhichToReportCGI is added (measID or reportConfig).

For example, existing ANR functionality does not support multi-connectivity deployments and/or architectures where the serving node may not have a neighbour relation established with a serving cell for the UE being configured to report CGI. For example, a relevant portion of 3GPP TS 38.331 (NR RRC Specification) states:

5.5.4.1 General

If security has been activated successfully, the UE shall:
1> for each measId included in the measIdList within VarMeasConfig:
. . .
2> else if the reportType or the corresponding reportConfig is set to reportCGI:
3> consider any neighbouring cell detected on the associated measurement object which has a physical cell identity matching the value of the cellForWhichToReportCGI to be applicable;

Similarly, a relevant portion of 3GPP TS 36.331 (LTE RRC Specification) states:

5.5.4 Measurement Report Triggering 5.5.4.1 General

If security has been activated successfully, the UE shall:
1> for each measId included in the measIdList within VarMeasConfig:
. . .
2> else if the corresponding reportConfig includes a purpose set to reportCGI:
3> consider any neighbouring cell detected on the associated frequency/set of frequencies (GERAN) which has a physical cell identity matching the value of the cellForWhichToReportCGI included in the corresponding measObject within the VarMeasConfig to be applicable;

As such, according to both NR and LTE specifications, the network can only configure a neighboring cell PCI to the UE for CGI reporting purposes. That existing solution may suffice in LTE SA because a serving eNB must have the CGI and neighbour relation information of a serving PSCell in the case of dual connectivity, since a single RRC entity is utilized at the network side and configurations are managed by the MeNB. Furthermore, in the case of CA, it is assumed that SCells either belong to the same node as the PCell or the same node as the PSCell.

Figure 4:
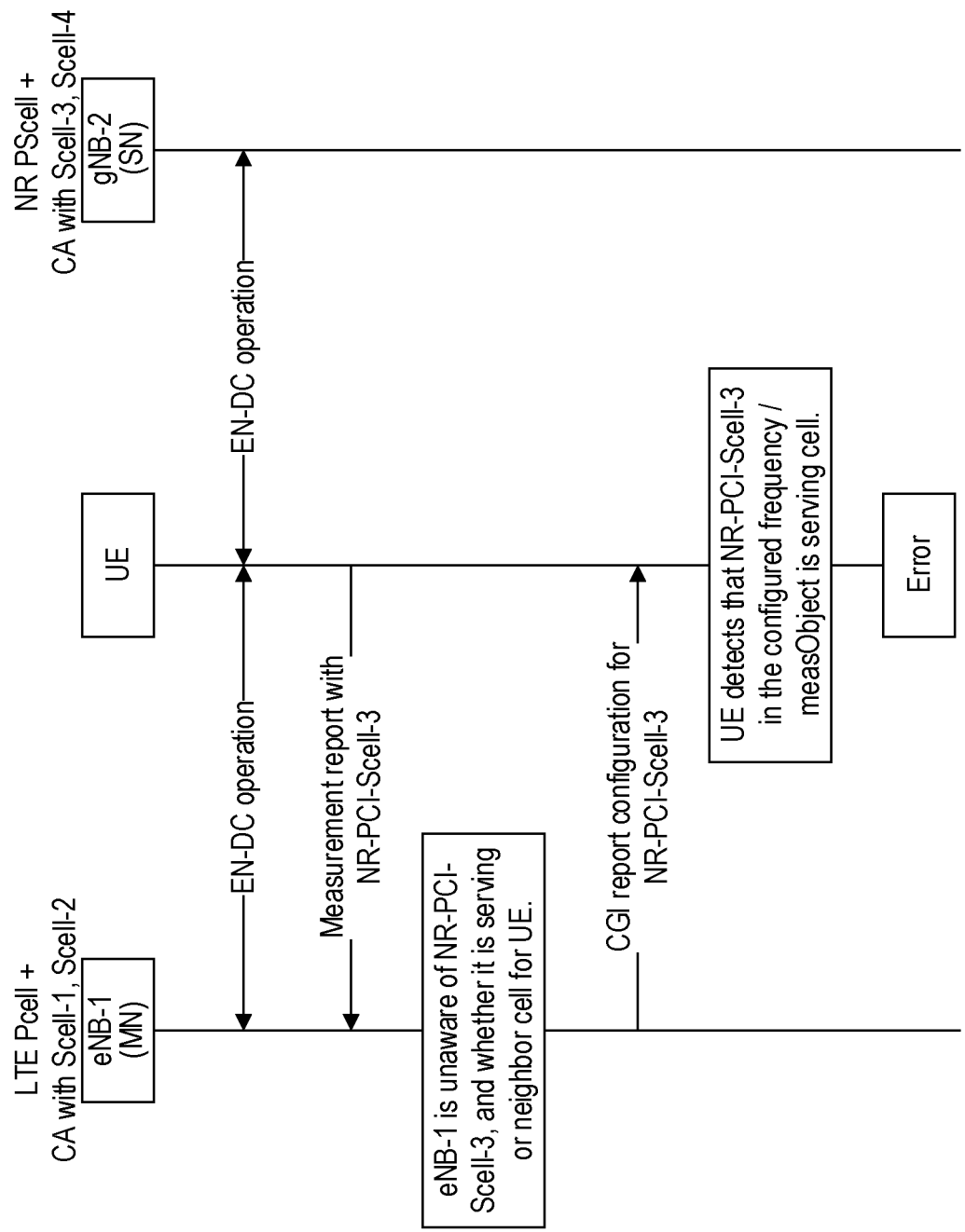
FIG. 4 illustrates a measurement reporting scenario for a UE in EN-DC with an LTE master node (MN) and an NR secondary node (SN).

However, that is unnecessarily limiting in NR and in new multi-connectivity architectures being standardized for 5G. In EN-DC, for example, a dual-RRC scheme has been adopted where either LTE RRC or NR RRC (possibly over signaling radio bearer SRB3) can configure the UE with a PCI and measurement object to perform CGI reporting. This situation is illustrated by FIG. 4, which shows a measurement reporting scenario for a UE in EN-DC with an LTE MN (e.g., eNB-1) and an NR SN (e.g., gNB-2). The NR MN provides the UE's PCell and two SCells (labelled SCell-1 and SCell-2) in CA with the PCell. Likewise, the LTE SN provides the UE's PSCell and two SCells (labelled SCell-3 and SCell-4) in CA with the PSCell.

In this scenario, the UE performs measurements and triggers a measurement report that includes PCI for an NR cell that is unknown to the MN (referred to as NR-PCI-SCell-3). Since that cell may be a candidate for PSCell change from the MN's perspective, the MN may want to configure the UE to report the CGI corresponding to NR-PCI-SCell-3. Even though SCell-3 is a UE serving cell in this scenario, the MN is not aware whether the cell identified by NR-PCI-SCell-3 is a neighbour or a serving cell for the UE. As such, the MN cannot be whether the requested CGI report will be delivered by the UE, or that the request will trigger an error in the UE (as shown).

It is also unclear, under the current solutions, whether a configured SCell in gNB-2 would trigger a measurement report to LTE. Currently, only B1 and B2 events are supported for inter-RAT event triggered measurement configuration and in their definition the term "neighbour" is used. However, it is not clearly defined with respect to the LTE RRC standard whether the PSCell or the SCell is a "neighbour" from the MN perspective, or whether the configured NR PSCell and NR SCells are considered as serving cells (and not considered as neighbors) even from the MN's perspective. As such, if the UE detects that a CGI report configuration has been received for a serving cell (e.g., identified by NR-PCI-SCell-3), it may generate an error condition and/or fail to return the requested CGI report.

In the LTE DC case, there was no such confusion because the UE has only one RRC stack running, which, when handling the measurement configurations, will be aware of both the MN and SN serving cells. In other words, the UE RRC will not confuse them the MN and SN serving cells with neighbor cells.

Despite this current ambiguity, there have been proposals to create new inter-RAT events in LTE to support MN-centric SN mobility or release. For example, a measurement trigger event could be defined in LTE which is triggered when NR PSCell becomes worse than an absolute threshold. This could be useful for MN-triggered SN release. As another example, a measurement trigger event could be defined in LTE which is triggered when NR PSCell becomes worse than absolute threshold1 and NR neighbour cell on a different carrier becomes better than absolute threshold2. This could be useful for MN-triggered SN change.

Even so, the current solutions as specified in the LTE and NR standards (e.g., RRC specifications) limit network deployment flexibility, in that only SN-triggered SN release and SN change are supported from the measurement perspective. Although MN can still trigger SN release and SN change, those triggers are not based on event-triggered measurements but rather on other conditions, e.g., load balancing decisions. Thus, an operator cannot decide to deploy a full-fledged, MN-centric solution.

Figure 5:
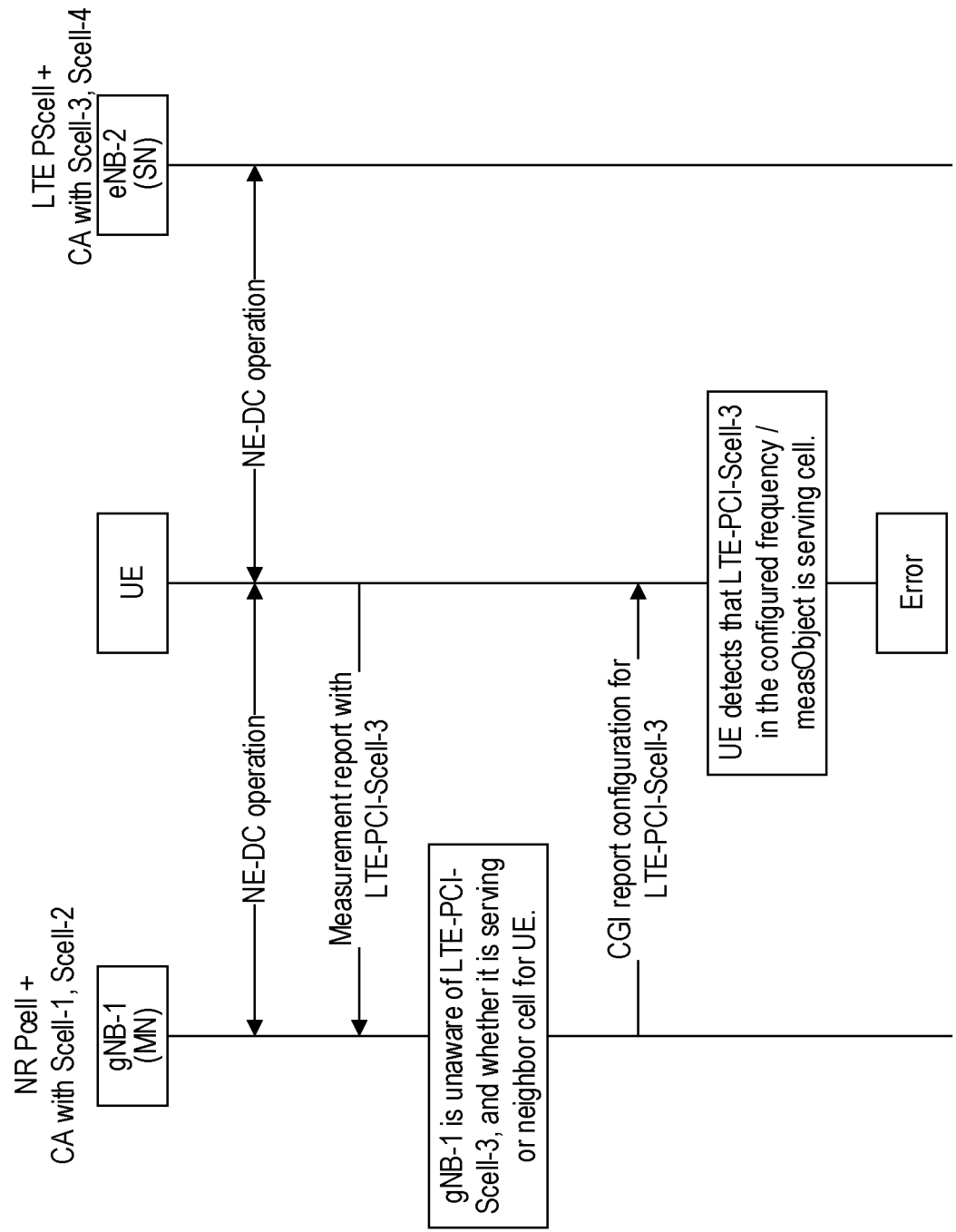
FIG. 5 illustrates a measurement reporting scenario for a UE in NE-DC with an NR MN and an LTE SN.

A similar issue may occur in the case a UE is in NE-DC. FIG. 5 illustrates a measurement reporting scenario for a UE in NE-DC with an NR MN (e.g., gNB-1) and an LTE SN (e.g., eNB-2). The LTE MN provides the UE's PCell and two SCells (labelled SCell-1 and SCell-2) in CA with the PCell. Likewise, the NR SN provides the UE's PSCell and two SCells (labelled SCell-3 and SCell-4) in CA with the PSCell.

In this scenario, the UE can perform measurements and trigger a measurement report that includes PCI for an LTE cell that is unknown to the MN (referred to as LTE-PCI-SCell-3). Since that cell may be a candidate for PSCell change from the MN's perspective, the MN may want to configure the UE to report the CGI corresponding to LTE-PCI-SCell-3. Even though SCell-3 is a UE serving cell in this scenario, the MN is not aware whether the cell identified by LTE-PCI-SCell-3 is a neighbour or a serving cell for the UE. As such, the MN cannot be whether the requested CGI report will be delivered by the UE, or that the request will trigger an error in the UE (as shown).

Agreements have not been reached with RAN2 on various aspects of NR SA DC architecture. However, one alternative being considered assumes two RRC entities generated by MN and SN, and there is also a possibility for the definition of an SRB3, where the SN can add serving cells directly without involving the MN. Thus, the existence of two RRC entities for the UE—one terminated at the MN and one at the SN—can create similar issues as discussed above. As such, the MN's RRC entity may not be not be aware whether a cell, for which it wants to obtain CGI, is a serving cell in the SN or a neighbour cell.

In summary, under current specified solutions in which only neighboring cells are to be detected and/or measured, certain CGI reporting configurations in which the network has configured the report of a serving cell could be interpreted inconsistently by the requested UE. If the specifications were updated only to prohibit such configurations, this would limit the flexibility and hinder the deployment of NR DC solutions.

Exemplary embodiments of the present disclosure address these and other problems and/or shortcomings of prior solutions by providing flexible mechanisms for enabling a user equipment (UE) operating in multi-connectivity (e.g., single-RAT or multi-RAT) and having multiple serving cells to reporting of the CGI of a serving cell upon request of a network node, thereby facilitating correct and efficient establishment of ANR.

In certain embodiments, a UE can be configured to read the CGI of a cell by a first node. The UE can perform a measurement to acquire the requested CGI—regardless of whether the cell is a serving cell or a neighbor cell—if the CGI for that cell has not been acquired earlier. The UE can then report the newly-acquired or already-available CGI to the node requesting the report. If the reported CGI is associated with a UE serving cell provided by a second node operating in multi-connectivity with the first node, the first node that requested the CGI report will know that it already has a neighbor relation to that second node (e.g., since the second node information is available in the reported CGI information). On the other hand, if the reported cell is not a UE serving cell, the first node can trigger the establishment of a neighbour relation to a third node providing the reported cell (e.g., since the third node information is available in the reported CGI). With the X2 (LTE) or Xn (NR) interface properly setup between the first node and the new third node, inter-RAT handover and/or DC operations such as SN change towards the new node can be performed using the newly established interface.

Figure 6:
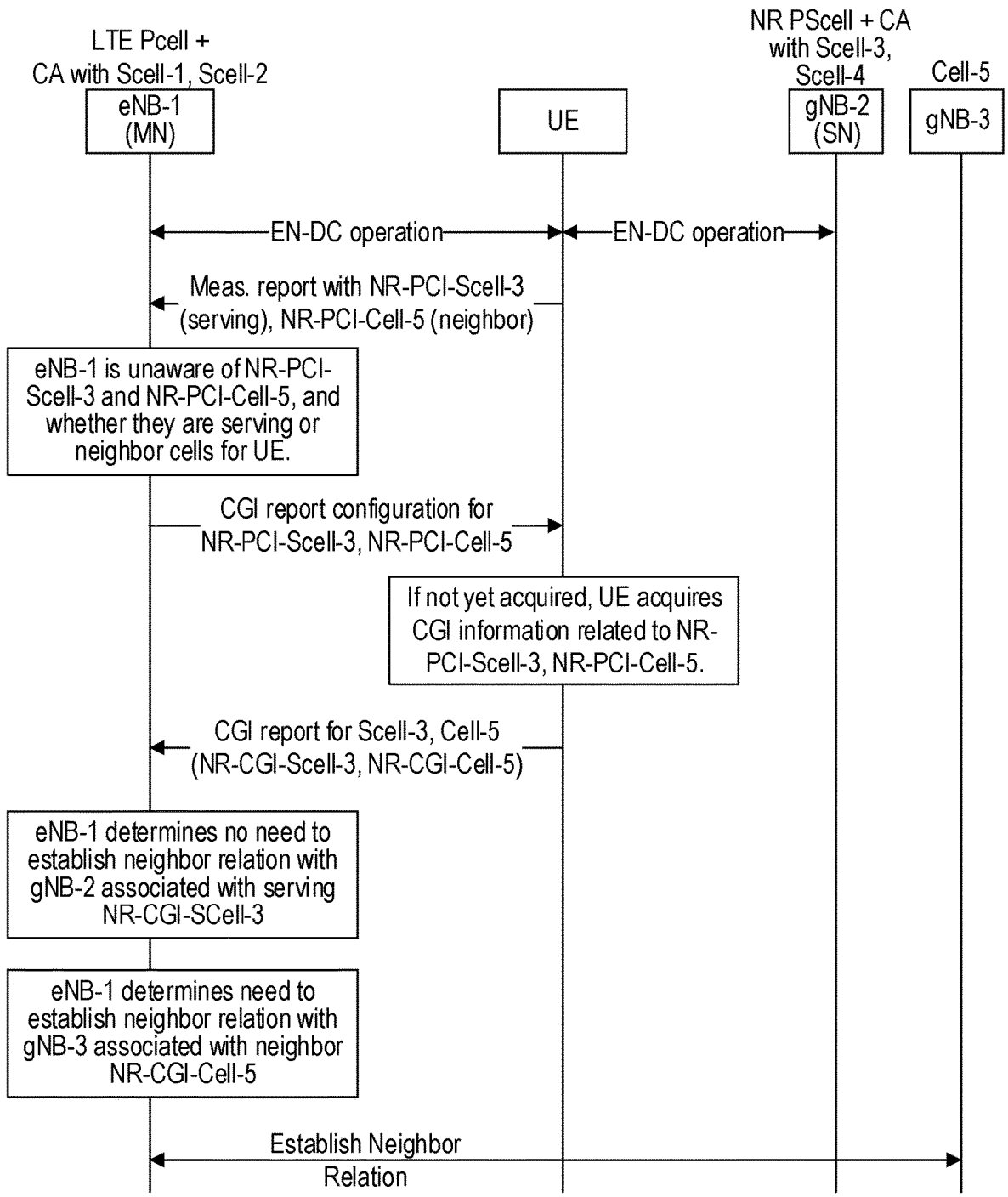
FIG. 6 illustrates an exemplary enhanced measurement reporting scenario for a UE in EN-DC with an LTE master node (MN) and an NR secondary node (SN), according to various exemplary embodiments of the present disclosure.

Such embodiments are illustrated by FIG. 6, which shows a signal flow diagram of a measurement reporting scenario for a UE in EN-DC with an LTE MN (eNB-1) and an NR SN (gNB-2). Although the operations in FIG. 6 are shown in a particular order, this order is merely exemplary, such that the operations can be arranged in a different order than shown. Moreover, the operations can be divided and/or combined into other operations having different amounts and/or types of functionality than shown.

In FIG. 6, the UE in EN-DC sends a measurement report to the eNB-1, i.e., the LTE MN that provides the UE's PCell and two SCells identified as SCell-1 and Scell-2.

This measurement report includes measurements for two NR cells—Scell-3, a secondary (serving) cell for the UE that is provided by the NR SN, gNB-2; and Cell-5, a neighbor cell provided by node gNB-3. The measurement report includes the PCIs for the two cells, i.e., NR-PCI-Scell-3 and NR-PCI-Cell-5, respectively. gNB-2 also provides two other cells—PSCell and SCell-4—used by the UE for DC/CA, but measurements for these cells are not included in the measurement report.

The LTE MN determines that it is unaware of both NR-PCI-Scell-3 and NR-PCI-Cell-5, and whether they are serving or neighbor cells for the UE. The LTE then sends a CGI report configuration to the UE for both cells. Alternately, the CGI report configuration can be provided by the NR SN, e.g., over SRB3 or embedded RRC in the MN's SRB1. The CGI report configuration includes PCIs for both cells, thereby identifying the cells for which the UE should report CGIs.

After receiving the CGI report configuration, the UE acquires CGI information for the cells corresponding to the included PCIs, if such CGI information has not already been acquired. For example, the UE can acquire the CGI information corresponding to NR-PCI-Scell-3 by reading SIB1 broadcast for the cell by gNB-2. The UE then sends the respective CGI information—labelled NR-CGI-Scell-3 and NR-CGI-Cell-5—to eNB-1 in a CGI report. Based on receiving the CGI report, eNB-1 determines whether a neighbor relation with each of the cells already exists (e.g., in eNB-1's NRT) or needs to be established.

As shown in FIG. 6, eNB-1 determines that it already has a neighbor relation with gNB-2 that is associated with NR-CGI-Scell-3, such that there is no need to establish a neighbor relation with that node. For example, due to the UE's EN-DC operation with gNB-2, eNB-1 likely has established an X2 interface with gNB-2. On the other hand, eNB-1 determines that it does not have a neighbor relation with gNB-3, and that one needs to be established to facilitate possible future UE mobility operations toward Cell-5/gNB-3. As shown in FIG. 6, eNB-1 subsequently establishes a neighbor relation with gNB-3.

FIG. 7 shows an exemplary amendment to 3GPP TS 38.331 (NR RRC Specification) to specify UE functionality according to the exemplary embodiments discussed above. In particular, rather than being specified to acquire CGI for "any neighbouring cell detected" with a PCI that matches an entry in a request, the UE functionality is specified according to these exemplary embodiments to acquire CGI for "any cell detected" with a matching PCI matching—regardless of neighboring status.

Various other embodiments are described below. Although these embodiments are not illustrated by individual signal flow diagrams and specification amendments, the skilled person will recognize that FIGS. 6 and 7 can be easily adapted to accommodate the specific differences between these embodiments and the above-described embodiments.

In some embodiments, the UE can be configured and/or requested (e.g., by a requesting node) to read and report the CGI information of a cell. Upon determining that this cell is one of a configured set of serving cells (e.g., by comparing the PCI comprising the configured measurement object), the UE acquires the CGI of the cell and reports it to the node requesting the CGI report, including whether the cell is an SCell or a PSCell. The UE may also include an associated PSCell in case the UE is in Multi-RAT DC and intra-RAT DC at the same time, and the secondary node of the SN is unknown by the MN.

In other embodiments, the UE can be configured and/or requested (e.g., by a requesting node) to read and report the CGI information of a cell. Upon determining that this cell is one of a configured set of serving cells (e.g., by comparing the PCI comprising the configured measurement object), the UE ignores the CGI report configuration and waits until the timer T321 expires and does not send the requested measurement report. By doing so, the UE effectively interprets the term "neighbour" in the specifications defining the report configuration as any cell that is neither the PCell, the PSCell, nor any configured SCell, even when the UE is in multi-connectivity, inter-RAT or intra-RAT.

In other embodiments, the UE can be configured and/or requested (e.g., by a requesting node) to read and report the CGI information of a cell. Upon determining that this cell is one of a configured set of serving cells (e.g., by comparing the PCI comprising the configured measurement object), the UE waits until the timer T321 expires and then sends an empty measurement report. Alternatively, the UE can include in the report information identifying that the requested cell is an SCell. For example, this information can be an indication flag or more detailed information indicating whether the requested cell is a PSCell or an SCell.

In other embodiments, upon setting up multi-connectivity with a MN, a SN can provide a list of SCells associated with the SN (and their respective PCIs) to the MN. Subsequently, whenever the SN adds, configures, and/or removes a serving cell, the SN can provide an update to the earlier-provided list. Alternately, the MN can explicitly request the SN (e.g., via an X2/Xn message) to provide the current list of the SN serving cells. Alternately, the UE can be configured to inform the MN whenever the SN configures it with a new serving cell. With full knowledge of the serving cells configured by the SN (provided in any manner including the ones discussed above), upon the reception of a measurement report pertaining to a particular cell, the MN will know that this particular cell is a serving cell associated to the SN, i.e., an inter-node interface is already setup. As such, the MN can perform mobility procedures immediately, or as needed.

In other embodiments, the UE is aware of a set of serving cells (e.g., SCell-1, SCell-2, . . . SCell-x) that are associated with a particular serving cell (e.g., a PSCell) for which the UE already knows the CGI. As such, although the UE may not know the SIB1 and CGI of a serving cell SCell-x, the UE necessarily knows the node identifier that can be extracted from the CGI of the particular serving cell (e.g., the PSCell). That can be the case when, e.g., a PSCell and SCell-x are associated with (or provided by) the same node.

In these embodiments, when the UE is configured and/or requested (e.g., by a MN) to read and report the CGI information of a configured serving cell, the UE includes the known node identifier without acquiring the entire CGI via reading SIB1, which can be inefficient in terms of power and time. For example, when indicating a PSCell, the UE could include the known node ID portion of the CGI plus padding or dummy bits in the cell identification portion. Furthermore, the measurement request used to configure the UE can be enhanced to indicate that the UE can report in this manner without reading CGI via SIB1, thereby saving resources and improving efficiency.

Other embodiments can involve operations between network nodes, rather than between a network node and a UE. In some embodiments, a first node (associated to a PSCell of a UE) can indicate to a second node (associated to a PCell of the UE) which of its served cells are serving cells of that particular UE. Given this PCell information, when the UE (e.g., in response to a measurement configuration as discussed above) reports serving cell PCIs (i.e., not full CGIs) to the second node, the second node can still determine whether or not it already has a neighbour relation with the first node.

Likewise, a first node (associated with a PCell of a UE) can indicate to a second node (associated with a PSCell of the UE) which of the cells provided by the first node are serving cells for the particular UE. Given this PSCell information, when the UE (e.g., in response to a measurement configuration as discussed above) reports serving cell PCIs (i.e., not full CGIs) to the second node, the second node can still determine whether or not it already has a neighbour relation with the first node.

Although exemplary embodiments have been discussed above in relation to EN-DC operation, other exemplary embodiments can facilitate NE-DC operation by reporting the CGI of LTE serving cells that the NR MN RRC entity is not aware of. In such case, the necessary UE functionality can be specified by amendments to 3GPP TS 36.331 (LTE RRC Specification) that are similar to the exemplary amendments to 3GPP TS 38.331 (NR RRC Specification) shown in FIG. 7.

Figure 8:
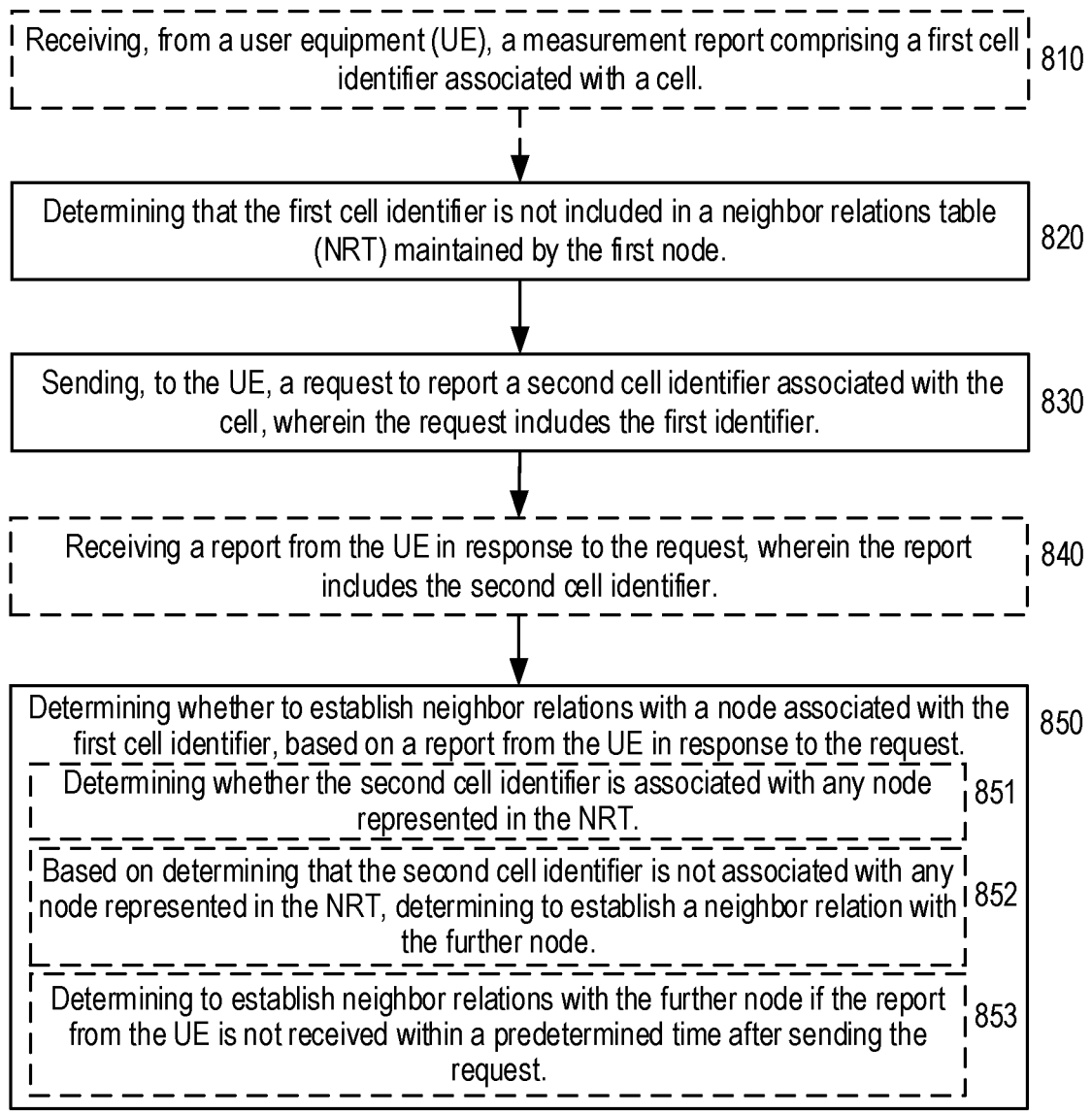
FIG. 8 is a flow diagram illustrating exemplary methods and/or procedures performed by a network node (e.g., base station, eNB, gNB, etc., or component thereof) in a radio access network (RAN), according to various exemplary embodiments of the present disclosure.

FIG. 8 is a flow diagram illustrating an exemplary method and/or procedure for a node, in a radio access network (RAN), to establish a neighbor relation with a further node in the RAN, according to various exemplary embodiments of the present disclosure. The exemplary method and/or procedure shown in FIG. 8 can be implemented, for example, by a master node (MN, e.g., eNB, gNB, or component thereof) operating in multi-connectivity towards a user equipment (UE) together with a secondary node (SN) in the RAN. Furthermore, the exemplary method and/or procedure shown in FIG. 8 can be used cooperatively with other exemplary methods and/or procedures described herein (e.g., FIG. 9) to provide various exemplary benefits described herein. Although FIG. 8 shows blocks in a particular order, this order is merely exemplary and the operations of the exemplary method and/or procedure can be performed in a different order than shown, and can be combined and/or divided into blocks having different functionality than shown. Optional operations are indicated by dashed lines.

In some embodiments, the exemplary method and/or procedure can include the operations of block 810, in which the master node can receive, from the UE, a measurement report comprising a first cell identifier associated with a cell. In some embodiments, the first cell identifier can be a physical cell identifier (PCI). Furthermore, the first cell identifier can be associated with a cell provided by the secondary node or by a further node in the RAN (i.e., a node not operating in multi-connectivity with the MN towards the UE). In some embodiments, the first node and the second node can utilize different radio access technologies (RATs).

The exemplary method and/or procedure can also include the operations of block 820, in which the master node can determine that the first cell identifier is not included in a neighbor relations table (NRT) maintained by the master node. The exemplary method and/or procedure can also include the operations of block 830, in which the first node can send, to the UE, a request to report a second cell identifier associated with the cell. The request can include the first cell identifier, and can be sent without the master node determining whether the cell is a serving cell for the UE or a neighbor cell for the UE. In some embodiments, the second cell identifier can be a cell global identifier (CGI).

In some embodiments, the exemplary method and/or procedure can also include the operations of block 840, in which the master node can receive, from the UE in response to the request, a report that includes the second cell identifier. In some embodiments, the report can also include an indication of whether the second cell identifier is associated with a serving cell for the UE or a neighbor cell for the UE. In some embodiments, if the report includes an indication that the second cell identifier is associated with a serving cell for the UE, the report can also include an indication of whether the serving cell is a primary secondary cell (PSCell) or a secondary cell (SCell). In some embodiments, if the report includes an indication that the second cell identifier is associated with a serving cell for the UE, the report can also include one or more further cell identifiers associated with respective further serving cells of the UE. For example, if the second cell identifier is associated with a PSCell, the report can also include the CGIs associated with one or more SCells.

The exemplary method and/or procedure can also include the operations of block 850, in which the master node can determine whether to establish neighbor relations with a node associated with the first cell identifier, based on a report from the UE in response to the request (e.g., the report received in block 840).

In some embodiments, the operations of block 850 can include the operations of block 851, where the master node can determine whether the second cell identifier (e.g., received in block 840) is associated with any node represented in the NRT. For example, this can include the secondary node and any other node having a neighbor relation already included in the NRT. Furthermore, this can involve determining whether the second cell identifier is associated with at least one of the following: a primary secondary cell (PSCell) of the UE, and a secondary cell (SCell) of the UE. In such embodiments, the operations of block 850 can also include the operations of block 852, where the master node can, based on determining that the second cell identifier is not associated with any node represented in the NRT, determine to establish a neighbor relation with the further node, i.e., the node associated with the first and second cell identifiers.

In some embodiments, the operations of block 850 can include the operations of block 853, where the master node can determine to establish neighbor relations with the further node (i.e., the node associated with the first cell identifier) if the report is not received within a predetermined time after sending the request.

Figure 9:
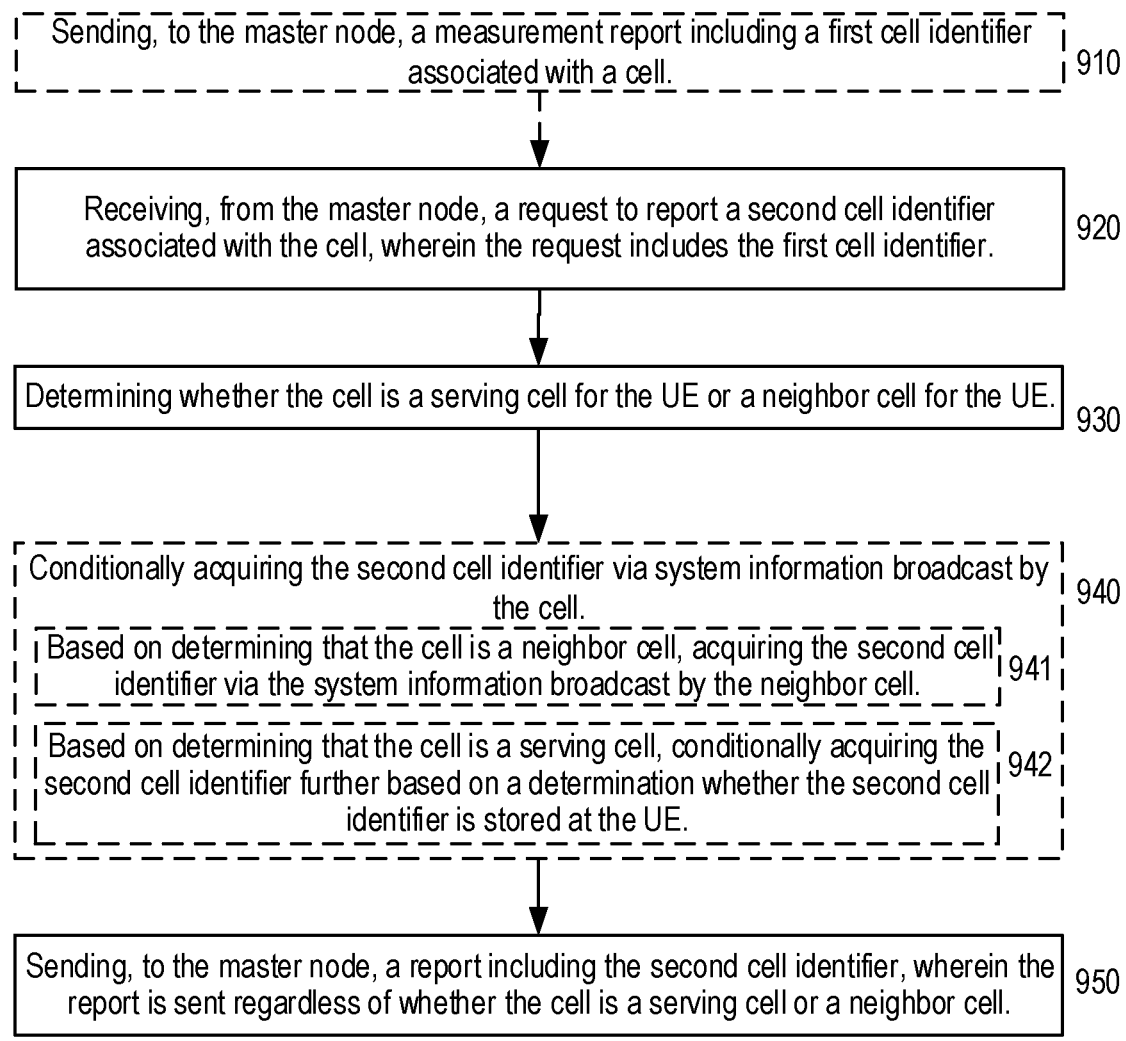
FIG. 9 is a flow diagram illustrating exemplary methods and/or procedures performed by user equipment (UE, e.g., wireless device, IoT device, etc. or component thereof), according to various exemplary embodiments of the present disclosure.

FIG. 9 is a flow diagram illustrating an exemplary method and/or procedure performed by a user equipment (UE, e.g., wireless device, IoT device, etc. or component thereof) in multi-connectivity with a master node and a secondary node in a radio access network (RAN), according to various exemplary embodiments of the present disclosure. Furthermore, the exemplary method and/or procedure shown in FIG. 9 can be utilized cooperatively with other exemplary methods and/or procedures described herein (e.g., FIG. 8) to provide various exemplary benefits described herein. Although FIG. 9 shows blocks in a particular order, this order is merely exemplary and the operations of the exemplary method and/or procedure can be performed in a different order than shown, and can be combined and/or divided into blocks having different functionality than shown. Optional operations are indicated by dashed lines.

The exemplary method and/or procedure can include the operations of block 910, in which the UE can send, to the master node, a measurement report including a first cell identifier associated with a cell. In some embodiments, the first cell identifier can be a physical cell identifier (PCI). Furthermore, the first cell identifier can be associated with a cell provided by the secondary node or by a further node in the RAN (i.e., a node not operating in multi-connectivity with a master node towards the UE). In some embodiments, the first node and the second node can utilize different radio access technologies (RATs).

The exemplary method and/or procedure can also include the operations of block 920, in which the UE can receive, from the first node, a request to report a second cell identifier associated with the cell. In some embodiments, the second cell identifier can be a cell global identifier (CGI). The request can include a first cell identifier associated with the cell, e.g., the first cell identifier sent by the UE in block 910. As mentioned above, the first cell identifier can be a physical cell identifier (PCI).

The exemplary method and/or procedure can also include the operations of block 930, in which the UE can determine whether the cell is a serving cell for the UE or a neighbor cell for the UE. For example, the UE's serving cells (e.g., PSCells and SCells) can be provided by the secondary node, and neighbor cells can be provided by further nodes in the RAN (e.g., nodes not operating in multi-connectivity with the master node towards the UE).

In some embodiments, the exemplary method and/or procedure can also include the operations of block 940, in which the UE can conditionally acquire the second cell identifier via system information broadcast by the cell, based on the determination (e.g., in block 930) of whether the cell associated with the first identifier is a serving cell or a neighbor cell. In some embodiments, the operations of block 940 can include the operations of sub-block 941, where the UE can, based on determining that the cell is a neighbor cell, acquire the second cell identifier for the neighbor cell via the system information broadcast by the neighbor cell. In such embodiments, the operations of block 940 can also include the operations of sub-block 942, where the UE can, based on determining that the cell is a serving cell, conditionally acquire the second cell identifier for the serving cell further based on a determination whether the second cell identifier is stored at the UE.

For example, based on determining that the second cell identifier is not stored at the UE, the UE can acquire the second cell identifier via system information broadcast by the serving cell. Alternately, if the UE determines that the second cell identifier is stored at the UE (e.g., from previous reception of serving cell broadcast SIB), the UE can refrain from acquiring the second cell identifier via the broadcast SIB.

The exemplary method and/or procedure can also include the operations of block 950, in which the UE can send, to the master node, a report comprising the second cell identifier. The report can be sent, in response to the request, regardless of whether the cell is a serving cell for the UE or a neighbor cell for the UE. In some embodiments, the report can also include an indication of whether the second cell identifier is associated with a serving cell for the UE or a neighbor cell for the UE. In some embodiments, if the report includes an indication that the second cell identifier is associated with a serving cell for the UE, the report can also include an indication of whether the serving cell is a primary secondary cell (PSCell) or a secondary cell (SCell). In some embodiments, if the report includes an indication that the second cell identifier is associated with a serving cell for the UE, the report can also include one or more further cell identifiers associated with respective further serving cells of the UE.

For example, if the second cell identifier is associated with a PSCell, the UE can also include the CGIs associated with one or more SCells.

Figure 10:
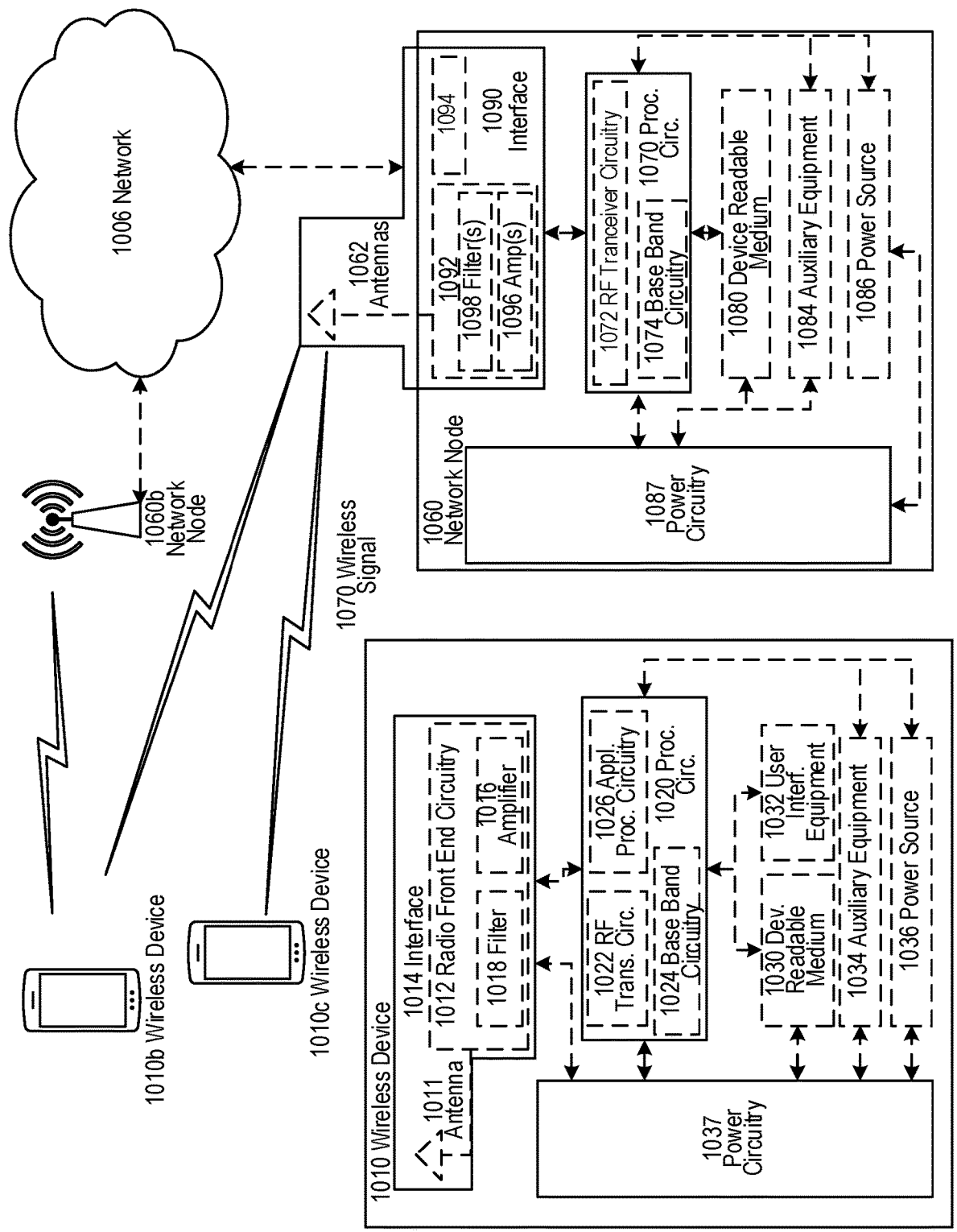
FIG. 10 illustrates an exemplary embodiment of a wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060b, and WDs 1010, 1010b, and 1010c. In practice, a wireless network can further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, NBs, eNBs, gNBs, or components thereof). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1060 are depicted as single boxes located within a larger box, or nested within multiple boxes, in practice, a network node can comprise multiple different physical components that make up a single illustrated component (e.g., device readable medium 1080 can comprise multiple separate hard drives as well as multiple RAM modules).

Similarly, network node 1060 can be composed of multiple physically separate components (e.g., a NodeB component and a RNC component, or a BTS component and a BSC component, etc.), which can each have their own respective components. In certain scenarios in which network node 1060 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1060 can be configured to support multiple radio access technologies (RATs). In such embodiments, some components can be duplicated (e.g., separate device readable medium 1080 for the different RATs) and some components can be reused (e.g., the same antenna 1062 can be shared by the RATs). Network node 1060 can also include multiple sets of the various illustrated components for different wireless technologies integrated into network node 1060, such as, for example, GSM, WCDMA, LTE, NR, WiFi, or Bluetooth wireless technologies. These wireless technologies can be integrated into the same or different chip or set of chips and other components within network node 1060.

Processing circuitry 1070 can be configured to perform any determining, calculating, or similar operations (e.g., certain obtaining operations) described herein as being provided by a network node. These operations performed by processing circuitry 1070 can include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 can execute instructions stored in device readable medium 1080 or in memory within processing circuitry 1070. Such functionality can include providing any of the various wireless features, functions, or benefits discussed herein. In some embodiments, processing circuitry 1070 can include a system on a chip (SOC).

In some embodiments, processing circuitry 1070 can include one or more of radio frequency (RF) transceiver circuitry 1072 and baseband processing circuitry 1074. In some embodiments, radio frequency (RF) transceiver circuitry 1072 and baseband processing circuitry 1074 can be on separate chips (or sets of chips), boards, or units, such as radio units and digital units. In alternative embodiments, part or all of RF transceiver circuitry 1072 and baseband processing circuitry 1074 can be on the same chip or set of chips, boards, or units In certain embodiments, some or all of the functionality described herein as being provided by a network node, base station, eNB or other such network device can be performed by processing circuitry 1070 executing instructions stored on device readable medium 1080 or memory within processing circuitry 1070. In alternative embodiments, some or all of the functionality can be provided by processing circuitry 1070 without executing instructions stored on a separate or discrete device readable medium, such as in a hard-wired manner In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1070. Device readable medium 1080 can store any suitable instructions, data or information, including a computer program, software, an application including one or more of logic, rules, code, tables, etc. and/or other instructions capable of being executed by processing circuitry 1070 and, utilized by network node 1060. Device readable medium 1080 can be used to store any calculations made by processing circuitry 1070 and/or any data received via interface 1090. In some embodiments, processing circuitry 1070 and device readable medium 1080 can be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that can be coupled to, or in certain embodiments a part of, antenna 1062. Radio front end circuitry 1092 comprises filters 1098 and amplifiers 1096. Radio front end circuitry 1092 can be connected to antenna 1062 and processing circuitry 1070. Radio front end circuitry can be configured to condition signals communicated between antenna 1062 and processing circuitry 1070. Radio front end circuitry 1092 can receive digital data that is to be sent out to other network nodes or WDs via a wireless connection. Radio front end circuitry 1092 can convert the digital data into a radio signal having the appropriate channel and bandwidth parameters using a combination of filters 1098 and/or amplifiers 1096. The radio signal can then be transmitted via antenna 1062. Similarly, when receiving data, antenna 1062 can collect radio signals which are then converted into digital data by radio front end circuitry 1092. The digital data can be passed to processing circuitry 1070. In other embodiments, the interface can comprise different components and/or different combinations of components.

In certain alternative embodiments, network node 1060 may not include separate radio front end circuitry 1092, instead, processing circuitry 1070 can comprise radio front end circuitry and can be connected to antenna 1062 without separate radio front end circuitry 1092. Similarly, in some embodiments, all or some of RF transceiver circuitry 1072 can be considered a part of interface 1090. In still other embodiments, interface 1090 can include one or more ports or terminals 1094, radio front end circuitry 1092, and RF transceiver circuitry 1072, as part of a radio unit (not shown), and interface 1090 can communicate with baseband processing circuitry 1074, which is part of a digital unit (not shown).

Antenna 1062 can include one or more antennas, or antenna arrays, configured to send and/or receive wireless signals. Antenna 1062 can be coupled to radio front end circuitry 1090 and can be any type of antenna capable of transmitting and receiving data and/or signals wirelessly. In some embodiments, antenna 1062 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1062 can be separate from network node 1060 and can be connectable to network node 1060 through an interface or port.

Antenna 1062, interface 1090, and/or processing circuitry 1070 can be configured to perform any receiving operations and/or certain obtaining operations described herein as being performed by a network node. Any information, data and/or signals can be received from a wireless device, another network node and/or any other network equipment. Similarly, antenna 1062, interface 1090, and/or processing circuitry 1070 can be configured to perform any transmitting operations described herein as being performed by a network node. Any information, data and/or signals can be transmitted to a wireless device, another network node and/or any other network equipment.

Power circuitry 1087 can comprise, or be coupled to, power management circuitry and can be configured to supply the components of network node 1060 with power for performing the functionality described herein. Power circuitry 1087 can receive power from power source 1086. Power source 1086 and/or power circuitry 1087 can be configured to provide power to the various components of network node 1060 in a form suitable for the respective components (e.g., at a voltage and current level needed for each respective component). Power source 1086 can either be included in, or external to, power circuitry 1087 and/or network node 1060. For example, network node 1060 can be connectable to an external power source (e.g., an electricity outlet) via an input circuitry or interface such as an electrical cable, whereby the external power source supplies power to power circuitry 1087. As a further example, power source 1086 can comprise a source of power in the form of a battery or battery pack which is connected to, or integrated in, power circuitry 1087. The battery can provide backup power should the external power source fail. Other types of power sources, such as photovoltaic devices, can also be used.

Alternative embodiments of network node 1060 can include additional components beyond those shown in FIG. 10 that can be responsible for providing certain aspects of the network node's functionality, including any of the functionality described herein and/or any functionality necessary to support the subject matter described herein. For example, network node 1060 can include user interface equipment to allow and/or facilitate input of information into network node 1060 and to allow and/or facilitate output of information from network node 1060. This can allow and/or facilitate a user to perform diagnostic, maintenance, repair, and other administrative functions for network node 1060.

In some embodiments, a wireless device (WD, e.g. WD 1010) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 can include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies can be integrated into the same or different chips or set of chips as other components within WD 1010.

Antenna 1011 can include one or more antennas or antenna arrays, configured to send and/or receive wireless signals, and is connected to interface 1014. In certain alternative embodiments, antenna 1011 can be separate from WD 1010 and be connectable to WD 1010 through an interface or port. Antenna 1011, interface 1014, and/or processing circuitry 1020 can be configured to perform any receiving or transmitting operations described herein as being performed by a WD. Any information, data and/or signals can be received from a network node and/or another WD. In some embodiments, radio front end circuitry and/or antenna 1011 can be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and can be configured to condition signals communicated between antenna 1011 and processing circuitry 1020. Radio front end circuitry 1012 can be coupled to or a part of antenna 1011. In some embodiments, WD 1010 may not include separate radio front end circuitry 1012; rather, processing circuitry 1020 can comprise radio front end circuitry and can be connected to antenna 1011. Similarly, in some embodiments, some or all of RF transceiver circuitry 1022 can be considered a part of interface 1014. Radio front end circuitry 1012 can receive digital data that is to be sent out to other network nodes or WDs via a wireless connection. Radio front end circuitry 1012 can convert the digital data into a radio signal having the appropriate channel and bandwidth parameters using a combination of filters 1018 and/or amplifiers 1016. The radio signal can then be transmitted via antenna 1011. Similarly, when receiving data, antenna 1011 can collect radio signals which are then converted into digital data by radio front end circuitry 1012. The digital data can be passed to processing circuitry 1020. In other embodiments, the interface can comprise different components and/or different combinations of components.

Processing circuitry 1020 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality can include providing any of the various wireless features or benefits discussed herein. For example, processing circuitry 1020 can execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry can comprise different components and/or different combinations of components. In certain embodiments processing circuitry 1020 of WD 1010 can comprise a SOC. In some embodiments, RF transceiver circuitry 1022, baseband processing circuitry 1024, and application processing circuitry 1026 can be on separate chips or sets of chips. In alternative embodiments, part or all of baseband processing circuitry 1024 and application processing circuitry 1026 can be combined into one chip or set of chips, and RF transceiver circuitry 1022 can be on a separate chip or set of chips. In still alternative embodiments, part or all of RF transceiver circuitry 1022 and baseband processing circuitry 1024 can be on the same chip or set of chips, and application processing circuitry 1026 can be on a separate chip or set of chips. In yet other alternative embodiments, part or all of RF transceiver circuitry 1022, baseband processing circuitry 1024, and application processing circuitry 1026 can be combined in the same chip or set of chips. In some embodiments, RF transceiver circuitry 1022 can be a part of interface 1014. RF transceiver circuitry 1022 can condition RF signals for processing circuitry 1020.

In certain embodiments, some or all of the functionality described herein as being performed by a WD can be provided by processing circuitry 1020 executing instructions stored on device readable medium 1030, which in certain embodiments can be a computer-readable storage medium. In alternative embodiments, some or all of the functionality can be provided by processing circuitry 1020 without executing instructions stored on a separate or discrete device readable storage medium, such as in a hard-wired manner In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 can be configured to perform any determining, calculating, or similar operations (e.g., certain obtaining operations) described herein as being performed by a WD. These operations, as performed by processing circuitry 1020, can include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 can be operable to store a computer program, software, an application including one or more of logic, rules, code, tables, etc. and/or other instructions capable of being executed by processing circuitry 1020. Device readable medium 1030 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1020. In some embodiments, processing circuitry 1020 and device readable medium 1030 can be considered to be integrated.

User interface equipment 1032 can include components that allow and/or facilitate a human user to interact with WD 1010. Such interaction can be of many forms, such as visual, audial, tactile, etc. User interface equipment 1032 can be operable to produce output to the user and to allow and/or facilitate the user to provide input to WD 1010. The type of interaction can vary depending on the type of user interface equipment 1032 installed in WD 1010. For example, if WD 1010 is a smart phone, the interaction can be via a touch screen; if WD 1010 is a smart meter, the interaction can be through a screen that provides usage (e.g., the number of gallons used) or a speaker that provides an audible alert (e.g., if smoke is detected). User interface equipment 1032 can include input interfaces, devices and circuits, and output interfaces, devices and circuits. User interface equipment 1032 can be configured to allow and/or facilitate input of information into WD 1010, and is connected to processing circuitry 1020 to allow and/or facilitate processing circuitry 1020 to process the input information. User interface equipment 1032 can include, for example, a microphone, a proximity or other sensor, keys/buttons, a touch display, one or more cameras, a USB port, or other input circuitry. User interface equipment 1032 is also configured to allow and/or facilitate output of information from WD 1010, and to allow and/or facilitate processing circuitry 1020 to output information from WD 1010. User interface equipment 1032 can include, for example, a speaker, a display, vibrating circuitry, a USB port, a headphone interface, or other output circuitry. Using one or more input and output interfaces, devices, and circuits, of user interface equipment 1032, WD 1010 can communicate with end users and/or the wireless network, and allow and/or facilitate them to benefit from the functionality described herein.

Auxiliary equipment 1034 is operable to provide more specific functionality which may not be generally performed by WDs. This can comprise specialized sensors for doing measurements for various purposes, interfaces for additional types of communication such as wired communications etc. The inclusion and type of components of auxiliary equipment 1034 can vary depending on the embodiment and/or scenario.

Power source 1036 can, in some embodiments, be in the form of a battery or battery pack. Other types of power sources, such as an external power source (e.g., an electricity outlet), photovoltaic devices or power cells, can also be used. WD 1010 can further comprise power circuitry 1037 for delivering power from power source 1036 to the various parts of WD 1010 which need power from power source 1036 to carry out any functionality described or indicated herein. Power circuitry 1037 can in certain embodiments comprise power management circuitry. Power circuitry 1037 can additionally or alternatively be operable to receive power from an external power source; in which case WD 1010 can be connectable to the external power source (such as an electricity outlet) via input circuitry or an interface such as an electrical power cable. Power circuitry 1037 can also in certain embodiments be operable to deliver power from an external power source to power source 1036. This can be, for example, for the charging of power source 1036. Power circuitry 1037 can perform any converting or other modification to the power from power source 1036 to make it suitable for supply to the respective components of WD 1010.

Figure 11:
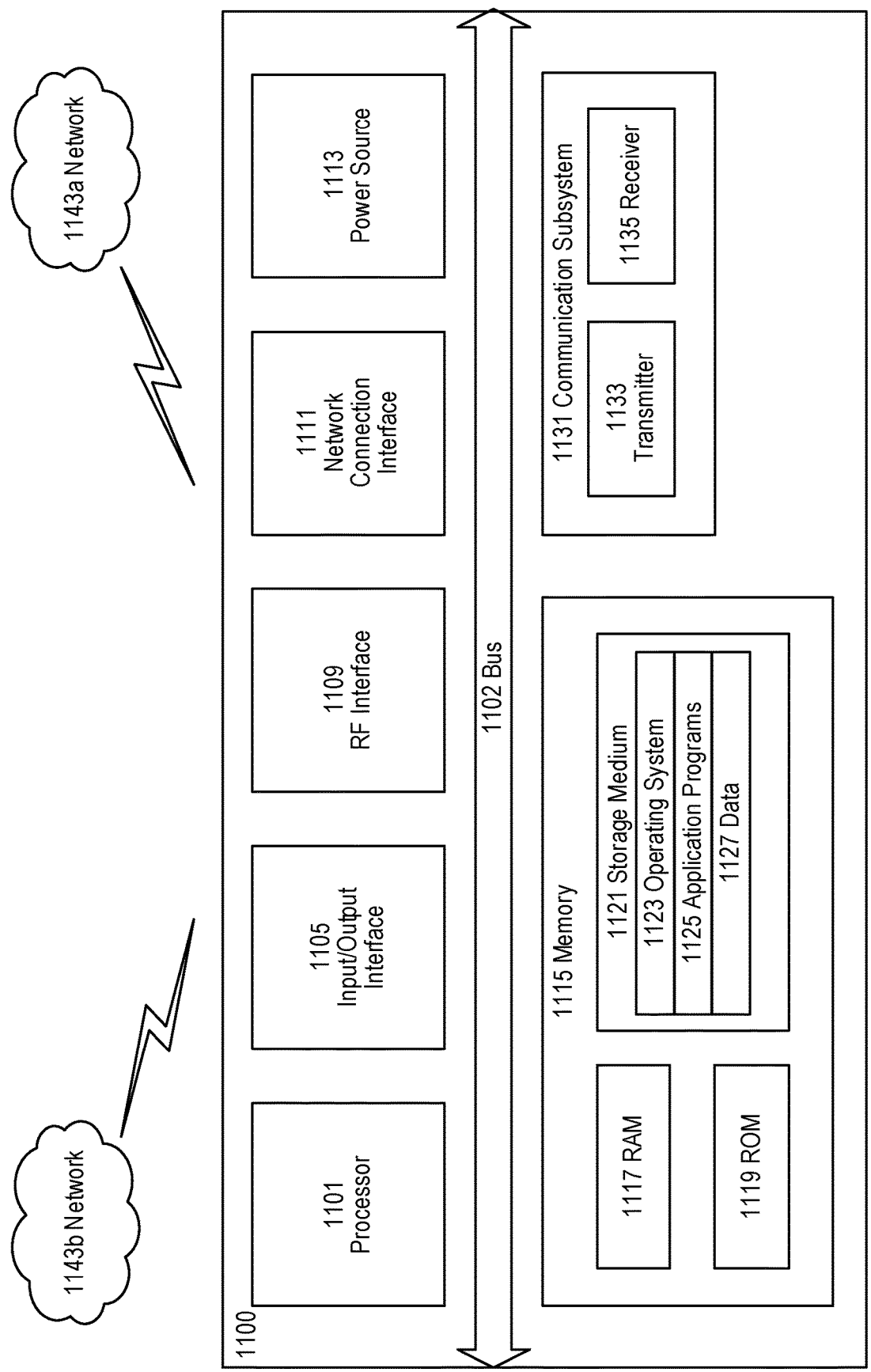
FIG. 11 illustrates an exemplary embodiment of a UE, according to various exemplary embodiments of the present disclosure.

FIG. 11 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 11200 can be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 can include other similar types of information. Certain UEs can utilize all of the components shown in FIG. 11, or only a subset of the components. The level of integration between the components can vary from one UE to another UE. Further, certain UEs can contain multiple instances of a component, such as multiple processors, memories, transceivers, transmitters, receivers, etc.

In FIG. 11, processing circuitry 1101 can be configured to process computer instructions and data. Processing circuitry 1101 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 can include two central processing units (CPUs). Data can be information in a form suitable for use by a computer.

In the depicted embodiment, input/output interface 1105 can be configured to provide a communication interface to an input device, output device, or input and output device. UE 1100 can be configured to use an output device via input/output interface 1105. An output device can use the same type of interface port as an input device. For example, a USB port can be used to provide input to and output from UE 1100. The output device can be a speaker, a sound card, a video card, a display, a monitor, a printer, an actuator, an emitter, a smartcard, another output device, or any combination thereof. UE 1100 can be configured to use an input device via input/output interface 1105 to allow and/or facilitate a user to capture information into UE 1100. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 11, RF interface 1109 can be configured to provide a communication interface to RF components such as a transmitter, a receiver, and an antenna. Network connection interface 1111 can be configured to provide a communication interface to network 1143a. Network 1143a can encompass wired and/or wireless networks such as a local-area network (LAN), a wide-area network (WAN), a computer network, a wireless network, a telecommunications network, another like network or any combination thereof. For example, network 1143a can comprise a Wi-Fi network. Network connection interface 1111 can be configured to include a receiver and a transmitter interface used to communicate with one or more other devices over a communication network according to one or more communication protocols, such as Ethernet, TCP/IP, SONET, ATM, or the like. Network connection interface 1111 can implement receiver and transmitter functionality appropriate to the communication network links (e.g., optical, electrical, and the like). The transmitter and receiver functions can share circuit components, software or firmware, or alternatively can be implemented separately.

RAM 1117 can be configured to interface via bus 1102 to processing circuitry 1101 to provide storage or caching of data or computer instructions during the execution of software programs such as the operating system, application programs, and device drivers. ROM 1119 can be configured to provide computer instructions or data to processing circuitry 1101. For example, ROM 1119 can be configured to store invariant low-level system code or data for basic system functions such as basic input and output (I/O), startup, or reception of keystrokes from a keyboard that are stored in a non-volatile memory. Storage medium 1121 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 can be configured to include operating system 1123, application program 1125 such as a web browser application, a widget or gadget engine or another application, and data file 1127. Storage medium 1121 can store, for use by UE 1100, any of a variety of various operating systems or combinations of operating systems.

Storage medium 1121 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 can allow and/or facilitate UE 1100 to access computer-executable instructions, application programs or the like, stored on transitory or non-transitory memory media, to off-load data, or to upload data. An article of manufacture, such as one utilizing a communication system can be tangibly embodied in storage medium 1121, which can comprise a device readable medium.

In FIG. 11, processing circuitry 1101 can be configured to communicate with network 1143*b* using communication subsystem 1131. Network 1143*a* and network 1143*b* can be the same network or networks or different network or networks. Communication subsystem 1131 can be configured to include one or more transceivers used to communicate with network 1143*b*. For example, communication subsystem 1131 can be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver can include transmitter 1133 and/or receiver 1135 to implement transmitter or receiver functionality, respectively, appropriate to the RAN links (e.g., frequency allocations and the like). Further, transmitter 1133 and receiver 1135 of each transceiver can share circuit components, software or firmware, or alternatively can be implemented separately.

In the illustrated embodiment, the communication functions of communication subsystem 1131 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 can include cellular communication, Wi-Fi communication, Bluetooth communication, and GPS communication. Network 1143*b* can encompass wired and/or wireless networks such as a local-area network (LAN), a wide-area network (WAN), a computer network, a wireless network, a telecommunications network, another like network or any combination thereof. For example, network 1143*b* can be a cellular network, a Wi-Fi network, and/or a near-field network. Power source 1113 can be configured to provide alternating current (AC) or direct current (DC) power to components of UE 1100.

The features, benefits and/or functions described herein can be implemented in one of the components of UE 1100 or partitioned across multiple components of UE 1100. Further, the features, benefits, and/or functions described herein can be implemented in any combination of hardware, software or firmware. In one example, communication subsystem 1131 can be configured to include any of the components described herein. Further, processing circuitry 1101 can be configured to communicate with any of such components over bus 1102. In another example, any of such components can be represented by program instructions stored in memory that when executed by processing circuitry 1101 perform the corresponding functions described herein. In another example, the functionality of any of such components can be partitioned between processing circuitry 1101 and communication subsystem 1131. In another example, the non-computationally intensive functions of any of such components can be implemented in software or firmware and the computationally intensive functions can be implemented in hardware.

Figure 12:
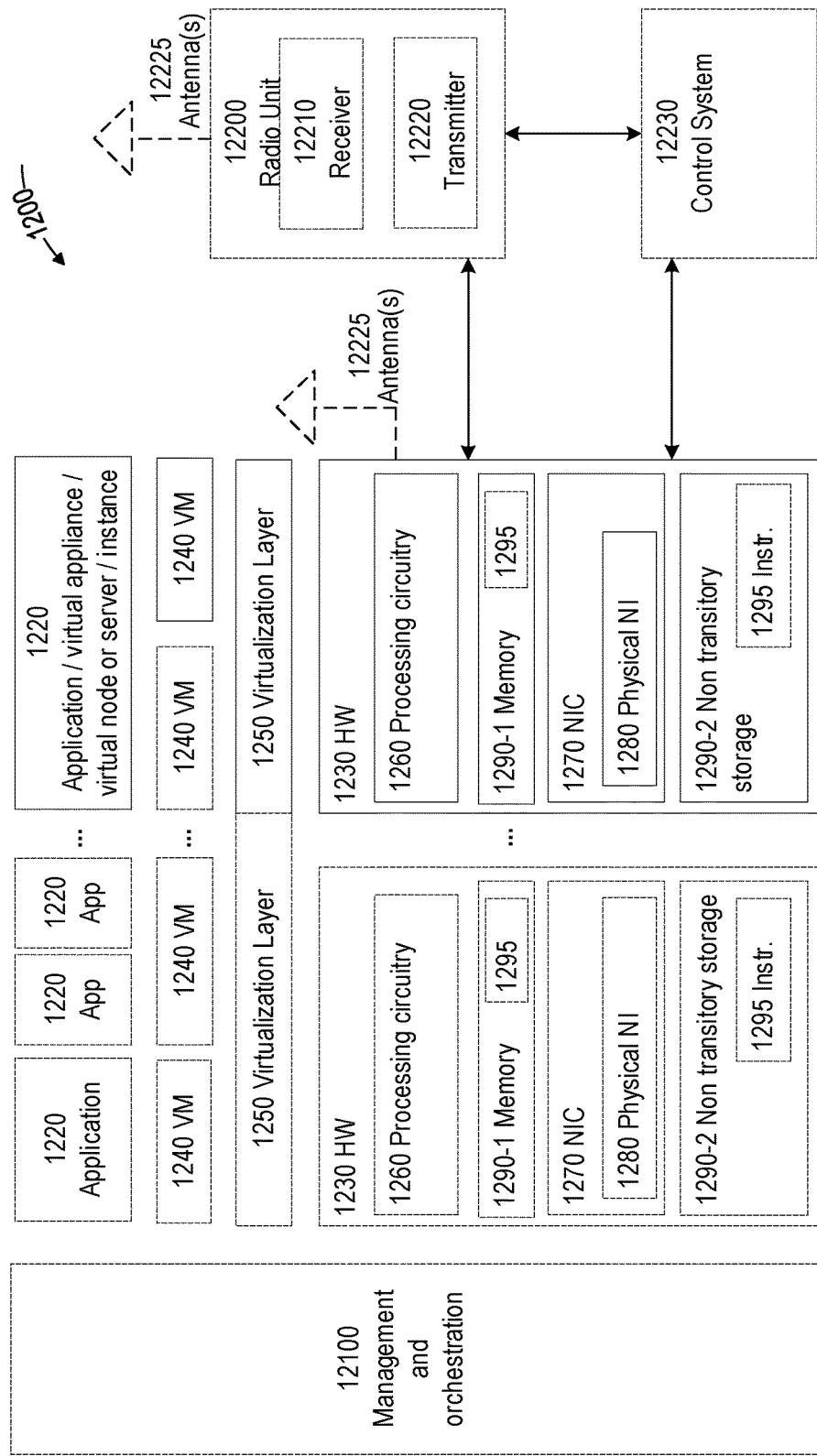
FIG. 12 is a block diagram illustrating an exemplary virtualization environment usable for implementation of various embodiments of network nodes described herein.

FIG. 12 is a schematic block diagram illustrating a virtualization environment 1200 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node can be entirely virtualized.

The functions can be implemented by one or more applications 1220 (which can alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which can be commercial off-the-shelf (COTS) processors, dedicated Application Specific Integrated Circuits (ASICs), or any other type of processing circuitry including digital or analog hardware components or special purpose processors. Each hardware device can comprise memory 1290-1 which can be non-persistent memory for temporarily storing instructions 1295 or software executed by processing circuitry 1260. Each hardware device can comprise one or more network interface controllers (NICs) 1270, also known as network interface cards, which include physical network interface 1280. Each hardware device can also include non-transitory, persistent, machine-readable storage media 1290-2 having stored therein software 1295 and/or instructions executable by processing circuitry 1260. Software 1295 can include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and can be run by a corresponding virtualization layer 1250 or hypervisor. Different embodiments of the instance of virtual appliance 1220 can be implemented on one or more of virtual machines 1240, and the implementations can be made in different ways.

During operation, processing circuitry 1260 executes software 1295 to instantiate the hypervisor or virtualization layer 1250, which can sometimes be referred to as a virtual machine monitor (VMM). Virtualization layer 1250 can present a virtual operating platform that appears like networking hardware to virtual machine 1240.

As shown in FIG. 12, hardware 1230 can be a standalone network node with generic or specific components. Hardware 1230 can comprise antenna 12225 and can implement some functions via virtualization. Alternatively, hardware 1230 can be part of a larger cluster of hardware (e.g., such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1240 can be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 can be coupled to one or more antennas 12225. Radio units 12200 can communicate directly with hardware nodes 1230 via one or more appropriate network interfaces and can be used in combination with the virtual components to provide a virtual node with radio capabilities, such as a radio access node or a base station.

In some embodiments, some signalling can be effected by control system 12230 which can alternatively be used for communication between the hardware nodes 1230 and radio units 12200.

Figure 13:
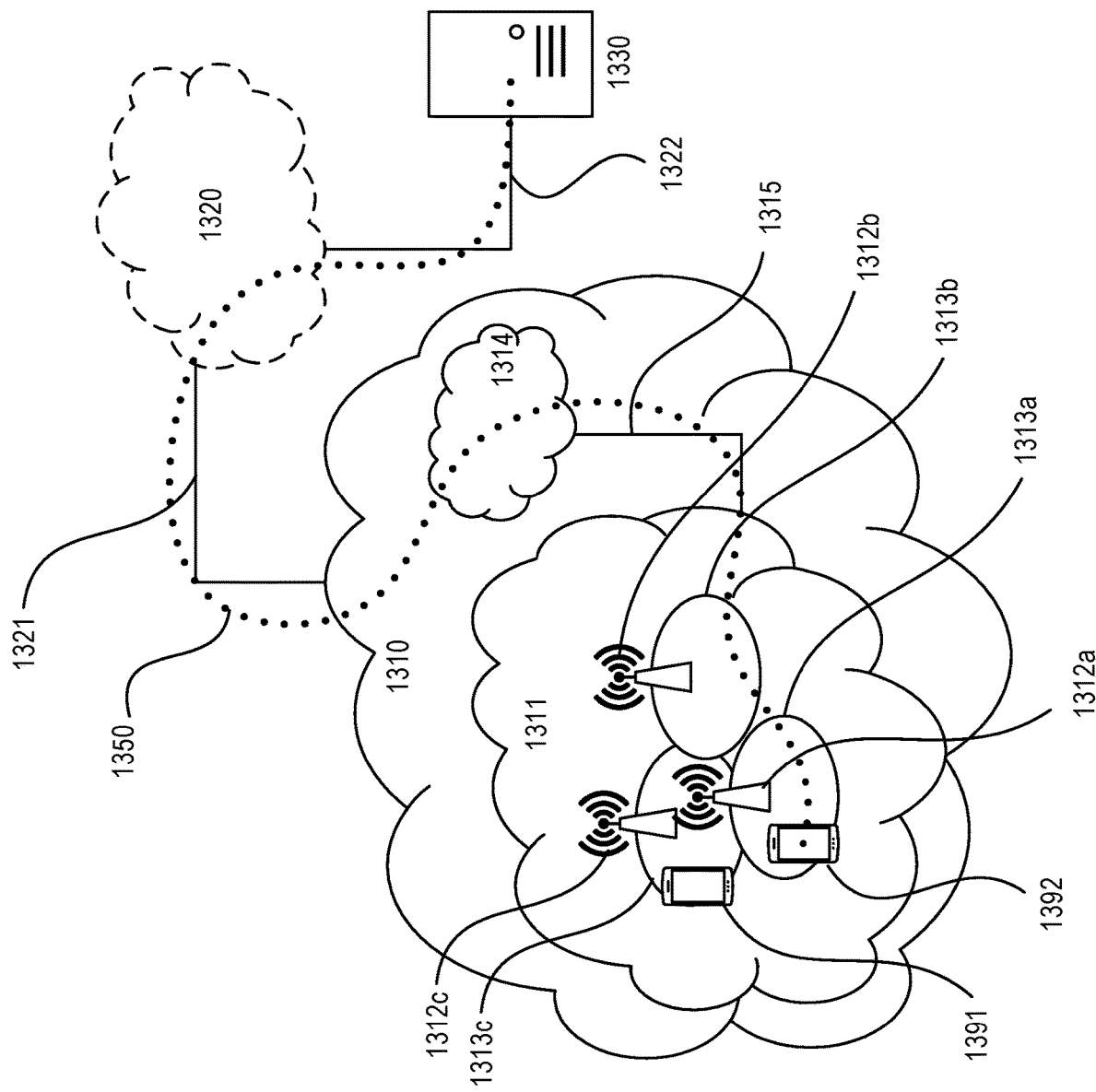
FIGS. 13-14 are block diagrams of various exemplary communication systems and/or networks, according to various exemplary embodiments of the present disclosure.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312*a*, 1312*b*, 1312*c*, such as NBs, eNBs, gNBs, or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first UE 1391 located in coverage area 1313*c* can be configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the Telecommunication network 1310 is itself connected to host computer 1330, which can be embodied in the hardware and/or software of a standalone server, a cloud-implemented server, a distributed server or as processing resources in a server farm. Host computer 1330 can be under the ownership or control of a service provider, or can be operated by the service provider or on behalf of the service provider. Connections 1321 and 1322 between telecommunication network 1310 and host computer 1330 can extend directly from core network 1314 to host computer 1330 or can go via an optional intermediate network 1320. Intermediate network 1320 can be one of, or a combination of more than one of, a public, private or hosted network; intermediate network 1320, if any, can be a backbone network or the Internet; in particular, intermediate network 1320 can comprise two or more sub-networks (not shown).

The communication system of FIG. 13 as a whole enables connectivity between the connected UEs 1391, 1392 and host computer 1330. The connectivity can be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 can be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which can have storage and/or processing capabilities. In particular, processing circuitry 1418 can comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 can be operable to provide a service to a remote user, such as UE 1430 connecting via OTT connection 1450 terminating at UE 1430 and host computer 1410. In providing the service to the remote user, host application 1412 can provide user data which is transmitted using OTT connection 1450.

Communication system 1400 can also include base station 1420 provided in a telecommunication system and comprising hardware 1425 enabling it to communicate with host computer 1410 and with UE 1430. Hardware 1425 can include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 can be configured to facilitate connection 1460 to host computer 1410. Connection 1460 can be direct or it can pass through a core network (not shown in FIG. 14) of the telecommunication system and/or through one or more intermediate networks outside the telecommunication system. In the embodiment shown, hardware 1425 of base station 1420 can also include processing circuitry 1428, which can comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 can also include UE 1430 already referred to. Its hardware 1435 can include radio interface 1437 configured to set up and maintain wireless connection 1470 with a base station serving a coverage area in which UE 1430 is currently located. Hardware 1435 of UE 1430 can also include processing circuitry 1438, which can comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 can be operable to provide a service to a human or non-human user via UE 1430, with the support of host computer 1410. In host computer 1410, an executing host application 1412 can communicate with the executing client application 1432 via OTT connection 1450 terminating at UE 1430 and host computer 1410. In providing the service to the user, client application 1432 can receive request data from host application 1412 and provide user data in response to the request data. OTT connection 1450 can transfer both the request data and the user data. Client application 1432 can interact with the user to generate the user data that it provides.

Figure 14:
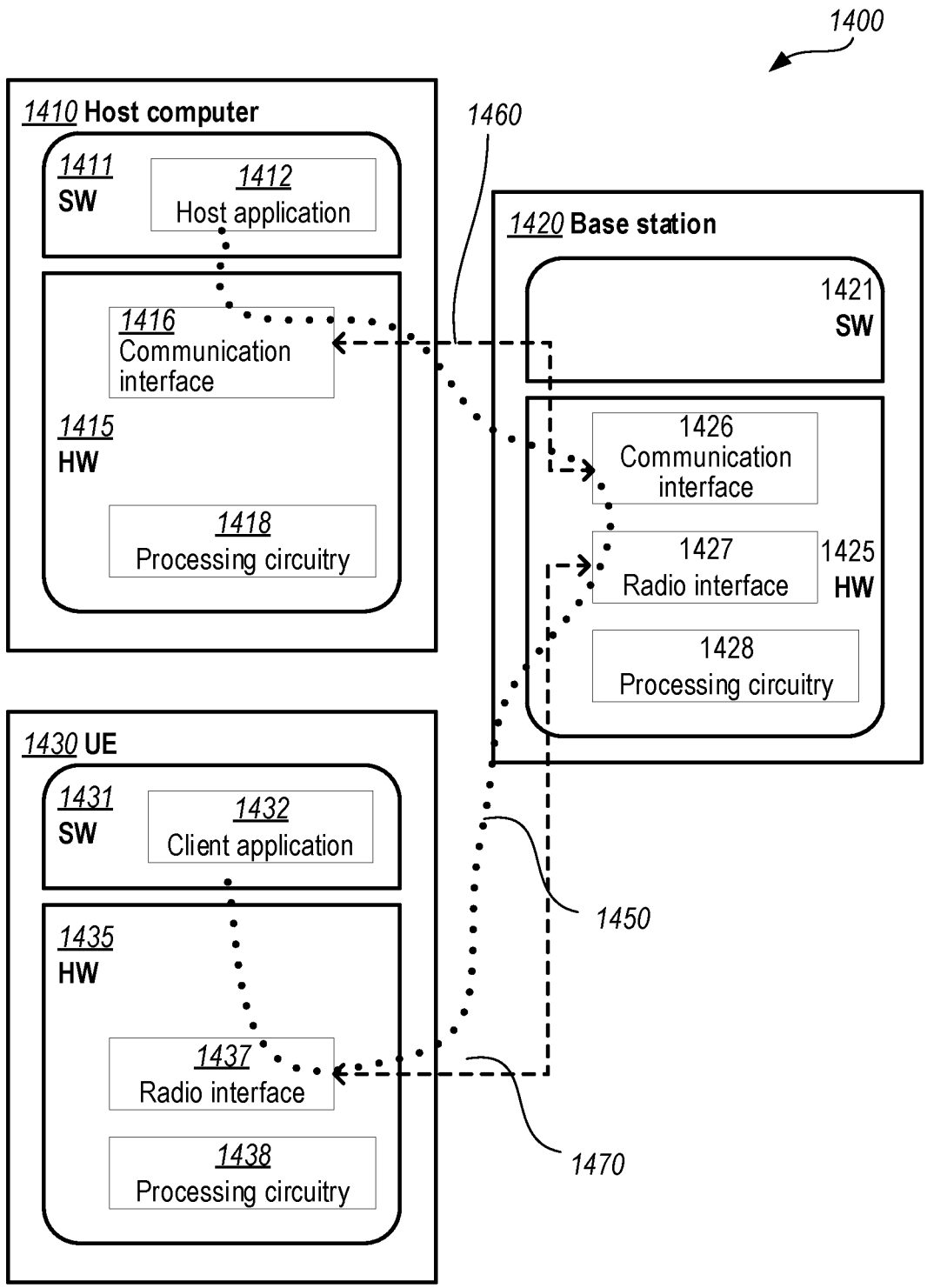

It is noted that host computer 1410, base station 1420 and UE 1430 illustrated in FIG. 14 can be similar or identical to host computer 1330, one of base stations 1312*a*, 1312*b*, 1312*c* and one of UEs 1391, 1392 of FIG. 13, respectively. This is to say, the inner workings of these entities can be as shown in FIG. 14 and independently, the surrounding network topology can be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure can determine the routing, which it can be configured to hide from UE 1430 or from the service provider operating host computer 1410, or both. While OTT connection 1450 is active, the network infrastructure can further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1450 between host computer 1410 and UE 1430, in response to variations in the measurement results. The measurement procedure and/or the network functionality for reconfiguring OTT connection 1450 can be implemented in software 1411 and hardware 1415 of host computer 1410 or in software 1431 and hardware 1435 of UE 1430, or both. In embodiments, sensors (not shown) can be deployed in or in association with communication devices through which OTT connection 1450 passes; the sensors can participate in the measurement procedure by supplying values of the monitored quantities exemplified above, or supplying values of other physical quantities from which software 1411, 1431 can compute or estimate the monitored quantities. The reconfiguring of OTT connection 1450 can include message format, retransmission settings, preferred routing etc.; the reconfiguring need not affect base station 1420, and it can be unknown or imperceptible to base station 1420. Such procedures and functionalities can be known and practiced in the art. In certain embodiments, measurements can involve proprietary UE signaling facilitating host computer 1410's measurements of throughput, propagation times, latency and the like. The measurements can be implemented in that software 1411 and 1431 causes messages to be transmitted, in particular empty or 'dummy' messages, using OTT connection 1450 while it monitors propagation times, errors etc.

FIG. 15 is a flowchart illustrating an exemplary method and/or procedure implemented in a communication system, in accordance with one embodiment. The communication system includes a host computer, a base station and a UE which, in some exemplary embodiments, can be those described with reference to FIGS. 13 and 14. For simplicity of the present disclosure, only drawing references to FIG. 15 will be included in this section. In step 1510, the host computer provides user data. In substep 1511 (which can be optional) of step 1510, the host computer provides the user data by executing a host application. In step 1520, the host computer initiates a transmission carrying the user data to the UE. In step 1530 (which can be optional), the base station transmits to the UE the user data which was carried in the transmission that the host computer initiated, in accordance with the teachings of the embodiments described throughout this disclosure. In step 1540 (which can also be optional), the UE executes a client application associated with the host application executed by the host computer.

FIG. 16 is a flowchart illustrating an exemplary method and/or procedure implemented in a communication system, in accordance with one embodiment. The communication system includes a host computer, a base station and a UE which can be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission can pass via the base station, in accordance with the teachings of the embodiments described throughout this disclosure. In step 1630 (which can be optional), the UE receives the user data carried in the transmission.

FIG. 17 is a flowchart illustrating an exemplary method and/or procedure implemented in a communication system, in accordance with one embodiment. The communication system includes a host computer, a base station and a UE which can be those described with reference to FIGS. 13 and 14. For simplicity of the present disclosure, only drawing references to FIG. 17 will be included in this section. In step 1710 (which can be optional), the UE receives input data provided by the host computer. Additionally or alternatively, in step 1720, the UE provides user data. In substep 1721 (which can be optional) of step 1720, the UE provides the user data by executing a client application. In substep 1711 (which can be optional) of step 1710, the UE executes a client application which provides the user data in reaction to the received input data provided by the host computer. In providing the user data, the executed client application can further consider user input received from the user. Regardless of the specific manner in which the user data was provided, the UE initiates, in substep 1730 (which can be optional), transmission of the user data to the host computer. In step 1740 of the method, the host computer receives the user data transmitted from the UE, in accordance with the teachings of the embodiments described throughout this disclosure.

FIG. 18 is a flowchart illustrating an exemplary method and/or procedure implemented in a communication system, in accordance with one embodiment. The communication system includes a host computer, a base station and a UE which can be those described with reference to FIGS. 13 and 14. For simplicity of the present disclosure, only drawing references to FIG. 18 will be included in this section. In step 1810 (which can be optional), in accordance with the teachings of the embodiments described throughout this disclosure, the base station receives user data from the UE. In step 1820 (which can be optional), the base station initiates transmission of the received user data to the host computer. In step 1830 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

1. A method for a first node, configured to provide one or more particular cells in a radio access network (RAN), to perform Automatic Neighbor Relations (ANR) with a second node that provides one or more further cells in the RAN, the method comprising:
   receiving, from a user equipment (UE) served by one of the particular cells as a primary cell (PCell), a measurement report comprising a first cell identifier associated with one of the further cells;
   determining that the first cell identifier is not included in a neighbor relations table (NRT) maintained by the first node;
   sending, to the UE, a request to measure a second cell identifier associated with the first cell identifier; and
   determining whether to establish neighbor relations with the second node, based on the reception and/or content of a report from the UE in response to the request.
2. The method of embodiment 1, wherein the first node is a master node (MN) in dual connectivity (DC) with the UE, whereby one of the particular cells is a primary cell (PCell) serving the UE.
3. The method of embodiment 2, wherein:
   the report comprises the second cell identifier; and
   determining whether to establish neighbor relations with the second node comprises:
   determining whether the second cell identifier is associated with a serving cell of the UE; and
   if it is determined that the second cell identifier is not associated with a serving cell of the UE, determining to establish neighbor relations with the second node.
4. The method of embodiment 3, wherein determining whether the second cell identifier is associated with a serving cell of the UE comprises determining whether the second cell identifier is associated with at least one of the following: a primary secondary cell (PSCell) of the UE, and a secondary cell (SCell) of the UE.
5. The method of any of embodiments 1-4, wherein determining whether to establish neighbor relations with the second node comprises: if the report from the UE is not received after a predetermined time, determining to establish neighbor relations with the second node.
6. The method of embodiments 1-5, wherein determining whether to establish neighbor relations with the second node comprises: if the report is received within a predetermined time but does not include the second cell identifier, determining to establish neighbor relations with the second node.
7. The method of any of embodiments 1-6, wherein the first cell identifier is a physical cell identifier (PCI) and the second cell identifier is a cell global identifier (CGI).
8. The method of any of embodiments 1-7, wherein the first node and the second node utilize different radio access technologies (RATs).
9. A method performed by a user equipment (UE) to support Automatic Neighbor Relations (ANR) between a first node and one or more further nodes in a radio access network (RAN), the first node configured to provide a particular cell that is the UE's primary cell (PCell), the method comprising:
   sending, to the first node, a measurement report comprising a first cell identifier associated with a further cell provided by a second node in the RAN;
   receiving, from the first node, a request to measure a second cell identifier associated with the first cell identifier; and
   indicating, to the first node, whether the further cell associated with the first cell identifier is a serving cell of the UE.
10. The method of embodiment 9, further comprising: if the UE has not previously acquired the second cell identifier, receiving the second cell identifier via system information broadcast by the further cell.
11. The method of any of embodiment 9-10, wherein:
   indicating whether the further cell associated with the first cell identifier is a serving cell of the UE comprises sending a report, to the first node, comprising the second cell identifier; and
   the report comprising the second cell identifier is sent to the first node regardless of whether the further cell is a serving cell of the UE.
12. The method of embodiment 11, further comprising sending, in the report, one or more further cell identifiers associated with respective further serving cells of the UE.
13. The method of any of embodiment 9-10, wherein indicating whether the further cell associated with the first cell identifier is a serving cell of the UE comprises: if the further cell is a serving cell of the UE, refraining from sending a report, responsive to the first node's request, for at least a predetermined time after receiving the first node's request.
14. The method of any of embodiment 9-10, wherein indicating whether the further cell associated with the first cell identifier is a serving cell of the UE comprises: if the further cell is a serving cell of the UE, sending a report, responsive to the first node's request, that does not include the second cell identifier.
15. The method of any of embodiments 9-14, wherein the first cell identifier is a physical cell identifier (PCI) and the second cell identifier is a cell global identifier (CGI).
16. The method of any of embodiments 9-15, wherein the first node and the second node utilize different radio access technologies (RATs).
17. A first node providing one or more cells in a radio access network (RAN) configured to perform Automatic Neighbor Relations (ANR) with one or more further nodes providing further cells of the RAN, the network node comprising:
   a communication interface; and
   processing circuitry operably coupled to the communication interface and configured to perform any operations of any of embodiments 1-8; and
   power supply circuitry configured to supply power to the network node.
18. A user equipment (UE) configured to support Automatic Neighbor Relations (ANR) between a first node and one or more further nodes of a radio access network (RAN), the first node configured to provide a particular cell that serves as a primary cell (PCell) of the UE and the further nodes configured to provide further cells, the UE comprising:
   a communication interface; and
   processing circuitry operably coupled to the communication interface and configured to perform any operations of any of embodiments 9-16; and
   power supply circuitry configured to supply power to the UE.

19. A communication system including a host computer comprising:
  processing circuitry configured to provide user data; and
  a communication interface configured to forward the user data to a cellular network for transmission to a user equipment (UE), wherein the cellular network comprises a base station having a radio interface and processing circuitry, the base station's processing circuitry configured to perform any of the operations comprising embodiments 1-8.

20. The communication system of the previous embodiment further including the base station.

21. The communication system of the previous two embodiments, further including the UE, wherein the UE includes a radio interface and processing circuitry configured to communicate with the base station and cooperatively perform any of the operations comprising embodiments 9-16.

22. The communication system of the previous three embodiments, wherein:
  the processing circuitry of the host computer is configured to execute a host application, thereby providing the user data; and
  the UE's processing circuitry is further configured to execute a client application associated with the host application.

23. A method implemented in a communication system including a host computer, a base station, and a User Equipment (UE), the method comprising:
  at the host computer, providing user data;
  at the host computer, initiating a transmission carrying the user data to the UE via a cellular network comprising the base station; and
  at the base station, performing operations corresponding to any of embodiments 1-8.

24. The method of the previous embodiment, further comprising, at the base station, transmitting the user data.

25. The method of the previous two embodiments, wherein the user data is provided at the host computer by executing a host application, the method further comprising, at the UE, executing a client application associated with the host application.

26. The method of the previous three embodiments, further comprising, at the UE, performing operations corresponding to any of embodiments 9-16.

27. A communication system including a host computer comprising a communication interface configured to receive user data originating from a transmission from a User equipment (UE) to a base station, the base station comprising a radio interface and processing circuitry configured to communicate with the base station and cooperatively perform operations of any of embodiments 1-8.

28. The communication system of the previous embodiment further including the base station.

29. The communication system of the previous two embodiments, further including the UE, wherein the UE includes a radio interface and processing circuitry configured to communicate with the base station and perform any of the operations comprising embodiments 9-16.

30. The communication system of the previous three embodiments, wherein:
  the processing circuitry of the host computer is configured to execute a host application; and
  the UE is further configured to execute a client application associated with the host application, thereby providing the user data to be received by the host computer.

The invention claimed is:

1. A method for a master node, in a radio access network (RAN), to establish a neighbor relation with a further node in the RAN, the master node operating in multi-connectivity towards a user equipment (UE) together with a secondary node in the RAN, the method comprising:
  determining that a first cell identifier, associated with a cell, is not included in a neighbor relations table (NRT) maintained by the master node;
  sending, to the UE, a request to report a second cell identifier associated with the cell, wherein the request includes the first cell identifier and is sent without determining whether the cell is a serving cell for the UE or a neighbor cell for the UE;
  receiving the report from the UE, wherein the report includes the second cell identifier, wherein the report also includes an indication of whether the second cell identifier is associated with a serving cell for the UE or a neighbor cell for the UE; and
  determining whether to establish a neighbor relation with a node associated with the first cell identifier, based on the report from the UE in response to the request,
    wherein determining whether to establish the neighbor relation with the node associated with the first cell identifier comprises determining to establish neighbor relations with the further node if the report is not received within a predetermined time after sending the request.

2. The method of claim 1, wherein the cell is provided by the secondary node or by the further node.

3. The method of claim 1, further comprising receiving, from the UE, a measurement report including the first cell identifier, wherein the determination that the first cell identifier is not included in the NR T is made in response to the measurement report.

4. The method of claim 1, wherein if the report includes an indication that the second cell identifier is associated with a serving cell for the UE, the report also includes an indication of whether the serving cell is a primary secondary cell (PSCell) or a secondary cell (SCell).

5. The method of claim 1, wherein if the report includes an indication that the second cell identifier is associated with a serving cell for the UE, the report also includes one or more further cell identifiers associated with respective further serving cells of the UE.

6. The method of claim 1, wherein determining whether the second cell identifier is associated with any node represented in the NRT comprises determining whether the second cell identifier is associated with at least one of the following: a primary secondary cell (PSCell) of the UE; and a secondary cell (SCell) of the UE.

7. The method of claim 1, wherein the first cell identifier is a physical cell identifier (PCI) and the second cell identifier is a cell global identifier (CGI).

8. A network node, of a radio access network (RAN), configured to operate in multi-connectivity towards a user equipment (UE) together with a secondary node in the RAN and to establish a neighbor relation with a further node in the RAN, the network node comprising:
  radio interface circuitry operable to communicate with the UE; and
  processing circuitry operably coupled to the radio interface circuitry, whereby the processing circuitry and the radio interface circuitry are configured to perform operations corresponding to the method of claim 1.

9. A non-transitory, computer-readable medium storing computer-executable instructions that, when executed by processing circuitry of a network node, configure the network node to perform operations corresponding to the method of claim 1.

10. The method of claim 1, wherein determining whether to establish a neighbor relation with the node associated with the first cell identifier comprises:
   determining whether the second cell identifier is associated with any node represented in the NRT; and
   based on determining that the second cell identifier is not associated with any node represented in the NRT, determining to establish a neighbor relation with the further node.

11. A method performed by a user equipment (UE) in multi-connectivity with a master node and a secondary node in a radio access network (RAN), the method comprising:
   receiving, from the master node, a request to report a second cell identifier associated with a cell, wherein the request comprises a first cell identifier associated with the cell;
   determining whether the cell is a serving cell for the UE or a neighbor cell for the UE;
   conditionally acquiring the second cell identifier via system information broadcast by the cell, based on the determination of whether the cell is a serving cell or a neighbor cell, wherein conditionally acquiring the second cell identifier for the serving cell comprises:
      based on determining that the cell is a serving cell, conditionally acquiring the second cell identifier for the serving cell based on a determination whether the second cell identifier is stored at the UE; and
      based on determining that the second cell identifier is not stored at the UE, acquiring the second cell identifier via system information broadcast by the serving cell; and
   sending, to the master node, a report including the second cell identifier, wherein the report also includes an indication of whether the second cell identifier is associated with a serving cell for the UE or a neighbor cell for the UE, and wherein the report is sent in response to the request regardless of whether the cell is a serving cell for the UE or a neighbor cell for the UE.

12. The method of claim 11, wherein conditionally acquiring the second cell identifier further comprises:
   based on determining that the cell is a neighbor cell, acquiring the second cell identifier for the neighbor cell via system information broadcast by the neighbor cell.

13. The method of claim 11, wherein if the report includes an indication that the second cell identifier is associated with a serving cell for the UE, the report also includes an indication of whether the serving cell is a primary secondary cell (PSCell) or a secondary cell (SCell).

14. The method of claim 11, wherein if the report includes an indication that the second cell identifier is associated with a serving cell for the UE, the report also includes one or more further cell identifiers associated with respective further serving cells of the UE.

15. The method of claim 11, further comprising sending, to the master node, a measurement report including the first cell identifier, wherein the request is received in response to the measurement report.

16. The method of claim 11, wherein the first cell identifier is a physical cell identifier (PCI) and the second cell identifier is a cell global identifier (CGI).

17. A user equipment, UE operable in multi-connectivity with a master node and a secondary node in a radio access network (RAN), the UE comprising:
   radio interface circuitry configured to communicate with the master node and the secondary node; and
   processing circuitry operably coupled to the radio interface circuitry, whereby the processing circuitry and the radio interface circuitry are configured to perform operations corresponding to the method of claim 11.

18. A non-transitory, computer-readable medium storing computer-executable instructions that, when executed by processing circuitry of a user equipment, configure the user equipment to perform operations corresponding to the method of claim 11.

* * * * *